United States Patent
Mun et al.

(10) Patent No.: US 9,590,781 B2
(45) Date of Patent: Mar. 7, 2017

(54) METHOD FOR TRANSMITTING BROADCAST SIGNAL, METHOD FOR RECEIVING BROADCAST SIGNAL, APPARATUS FOR TRANSMITTING BROADCAST SIGNAL, AND APPARATUS FOR RECEIVING BROADCAST SIGNAL

(71) Applicant: LG ELECTRONICS INC., Seoul (KR)

(72) Inventors: Chulkyu Mun, Seoul (KR); Jaehyung Kim, Seoul (KR); Sungryong Hong, Seoul (KR); Jongseob Baek, Seoul (KR); Byounggill Kim, Seoul (KR); Woosuk Ko, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

(21) Appl. No.: 14/911,644

(22) PCT Filed: Aug. 12, 2014

(86) PCT No.: PCT/KR2014/007485
§ 371 (c)(1),
(2) Date: Feb. 11, 2016

(87) PCT Pub. No.: WO2015/023107
PCT Pub. Date: Feb. 19, 2015

(65) Prior Publication Data
US 2016/0197708 A1    Jul. 7, 2016

Related U.S. Application Data

(60) Provisional application No. 61/865,147, filed on Aug. 13, 2013, provisional application No. 61/873,835, filed on Sep. 5, 2013.

(51) Int. Cl.
*H04L 27/00* (2006.01)
*H04L 5/00* (2006.01)
(Continued)

(52) U.S. Cl.
CPC .......... *H04L 5/0048* (2013.01); *H04L 1/007* (2013.01); *H04L 1/0065* (2013.01);
(Continued)

(58) Field of Classification Search
CPC ... H04L 1/0003; H04L 1/0071; H04W 72/005
(Continued)

(56) References Cited

U.S. PATENT DOCUMENTS

2009/0213853 A1    8/2009  Kwon et al.
2015/0365204 A1*  12/2015  Baek .................. H04N 21/2383
                                                                        375/267
2016/0218902 A1*   7/2016  Hwang ............... H04L 27/2626

FOREIGN PATENT DOCUMENTS

KR    10-2012-0139520 A    12/2012
WO        2011096709 A2     8/2011
(Continued)

*Primary Examiner* — Khai Tran
(74) *Attorney, Agent, or Firm* — Dentons US LLP

(57) ABSTRACT

The present invention provides a method for transmitting a broadcast signal. The method for transmitting a broadcast signal according to the present invention may comprise the steps of: encoding data pipe (DP) data corresponding to each of a plurality of DPs which transmit at least one service or service component; generating at least one signal frame by mapping the encoded DP data to data symbols; modulating data present in the at least one signal frame by means of an OFDM scheme; and transmitting a broadcast signal including the modulated data.

20 Claims, 25 Drawing Sheets

(51) Int. Cl.
*H04L 27/26* (2006.01)
*H04L 1/00* (2006.01)

(52) U.S. Cl.
CPC .......... *H04L 1/0071* (2013.01); *H04L 1/0072* (2013.01); *H04L 5/0007* (2013.01); *H04L 27/2614* (2013.01); *H04L 27/2626* (2013.01); *H04L 1/0057* (2013.01); *H04L 5/0044* (2013.01); *H04L 2001/0093* (2013.01)

(58) Field of Classification Search
USPC ......... 375/295, 130, 296, 340; 370/312, 390
See application file for complete search history.

(56) References Cited

FOREIGN PATENT DOCUMENTS

| | | | |
|---|---|---|---|
| WO | 2011096768 | A2 | 8/2011 |
| WO | 2012067362 | A2 | 5/2012 |

\* cited by examiner

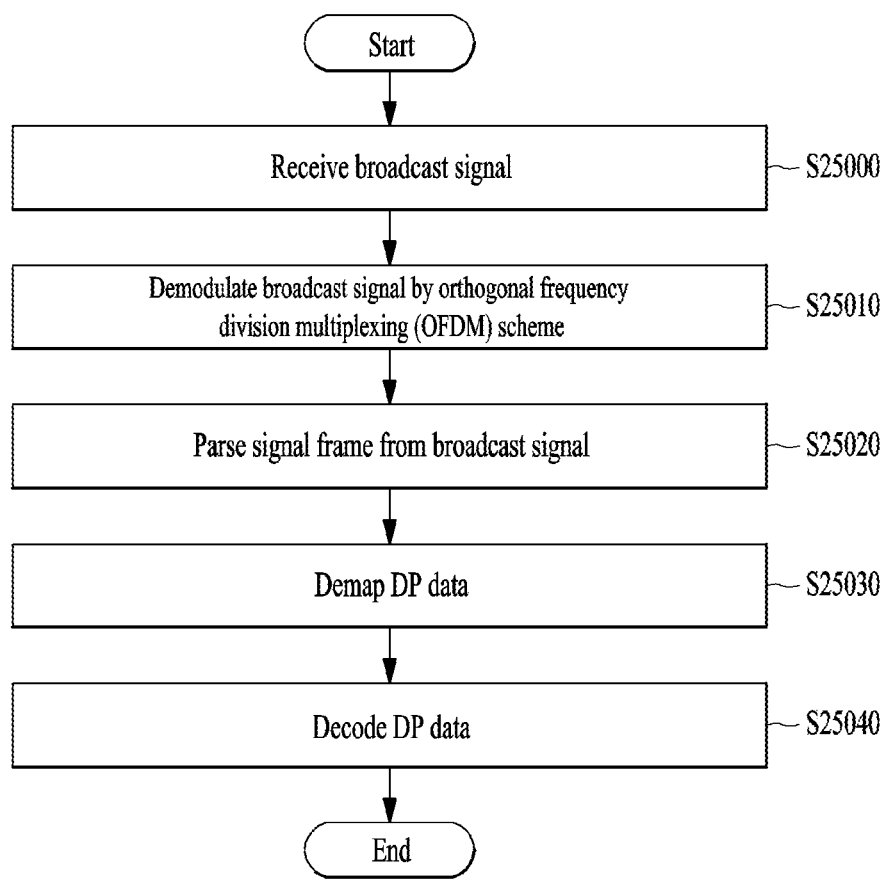

METHOD FOR TRANSMITTING BROADCAST SIGNAL, METHOD FOR RECEIVING BROADCAST SIGNAL, APPARATUS FOR TRANSMITTING BROADCAST SIGNAL, AND APPARATUS FOR RECEIVING BROADCAST SIGNAL

This application is a National Stage Entry of International Application No. PCT/KR2014/007485, filed on Aug. 12, 2014, and claims the benefit of and priority to Provisional Application Nos. 61/865,147, filed Aug. 13, 2013 and 61/873,835 filed Sep. 5, 2013, all of which are hereby incorporated by reference in their entirety for all purposes as if fully set forth herein.

TECHNICAL FIELD

The present invention relates to an apparatus for transmitting broadcast signals, an apparatus for receiving broadcast signals and methods for transmitting and receiving broadcast signals.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

DISCLOSURE

Technical Problem

Accordingly, the present invention is directed to an apparatus for transmitting broadcast signals and an apparatus for receiving broadcast signals for future broadcast services and methods for transmitting and receiving broadcast signals for future broadcast services.

Solution to Problem

The object of the present invention can be achieved by providing a broadcast signal transmission method. The broadcast signal transmission method according to the present invention may include encoding data pipe (DP) data corresponding to each of a plurality of DPs transmitting at least one service or service component, generating at least one signal frame by mapping the encoded DP data to data symbols, modulating data included in the at least one signal frame by an orthogonal frequency division multiplexing (OFDM) scheme, and transmitting a broadcast signal including the modulated data.

Advantageous Effects of Invention

The present invention can provide an efficient broadcast signal transmission method, broadcast signal reception method, broadcast signal transmission apparatus, and broadcast signal reception apparatus.

The present invention can raise data transmission efficiency and increase robustness of broadcast signal transmission and reception.

BRIEF DESCRIPTION OF DRAWINGS

FIG. 25 is a flowchart illustrating a broadcast signal reception method according to an embodiment of the present invention.

BEST MODE FOR CARRYING OUT THE INVENTION

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas.

Figure 1:
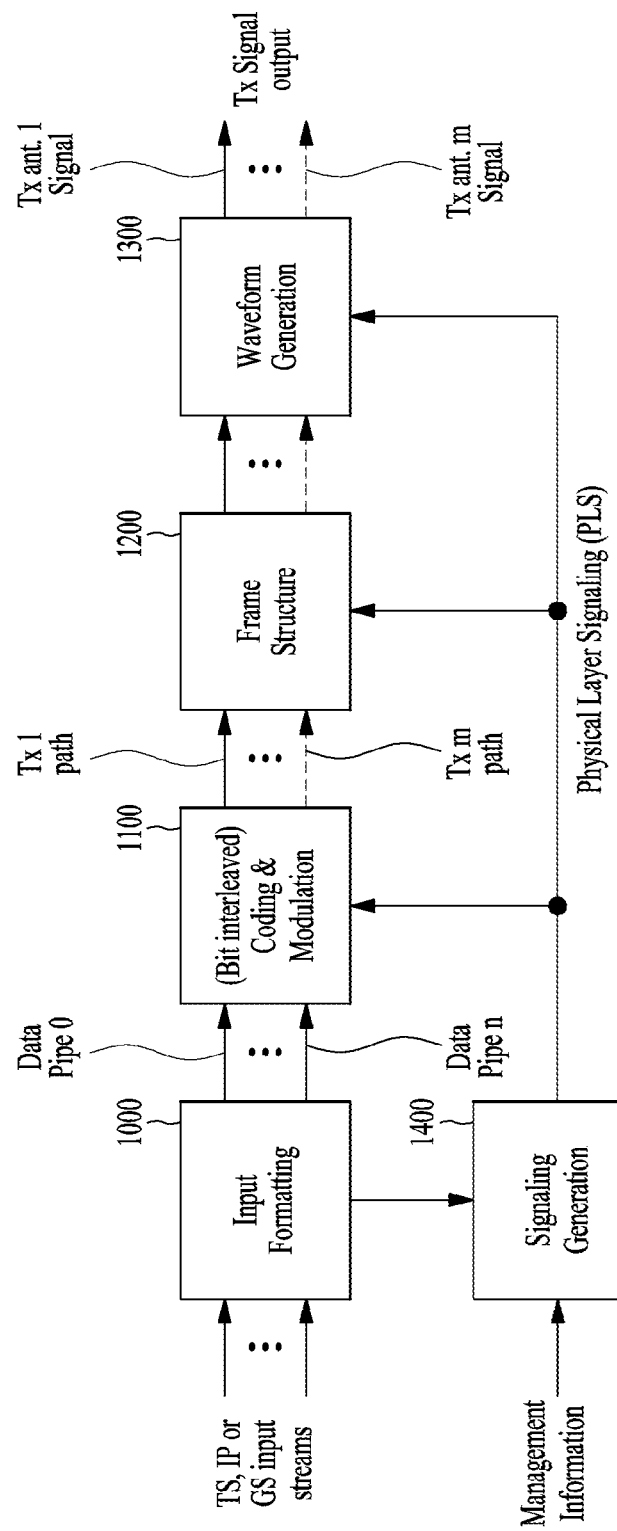
FIG. 1 illustrates a structure of an apparatus for transmitting broadcast signals for future broadcast services according to an embodiment of the present invention.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting module 1000, a coding & modulation module 1100, a frame structure module 1200, a waveform generation module 1300 and a signaling generation module 1400. A description will be given of the operation of each module of the apparatus for transmitting broadcast signals.

Referring to FIG. 1, the apparatus for transmitting broadcast signals for future broadcast services according to an embodiment of the present invention can receive MPEG-TSs, IP streams (v4/v6) and generic streams (GSs) as an input signal. In addition, the apparatus for transmitting broadcast signals can receive management information about the configuration of each stream constituting the input signal and generate a final physical layer signal with reference to the received management information.

The input formatting module 1000 according to an embodiment of the present invention can classify the input streams on the basis of a standard for coding and modulation or services or service components and output the input streams as a plurality of logical data pipes (or data pipes (DPs)). The data pipe is a logical channel in the physical layer that carries service data or related metadata, which may carry one or multiple service(s) or service component(s). In addition, data transmitted through each data pipe may be called DP data.

In addition, the input formatting module 1000 according to an embodiment of the present invention can divide each data pipe into blocks necessary to perform coding and modulation and carry out processes necessary to increase transmission efficiency or to perform scheduling. Details of operations of the input formatting module 1000 will be described later.

The coding & modulation module 1100 according to an embodiment of the present invention can perform forward error correction (FEC) encoding on each data pipe received from the input formatting module 1000 such that an apparatus for receiving broadcast signals can correct an error that may be generated on a transmission channel. In addition, the coding & modulation module 1100 according to an embodiment of the present invention can convert FEC output bit data to symbol data and interleave the symbol data to correct burst error caused by a channel. As shown in FIG. 1, the coding & modulation module 1100 according to an embodiment of the present invention can divide the processed data such that the divided data can be output through data paths for respective antenna outputs in order to transmit the data through two or more Tx antennas.

The frame structure module 1200 according to an embodiment of the present invention can map the data output from the coding & modulation module 1100 to signal frames. The frame structure module 1200 according to an embodiment of the present invention can perform mapping using scheduling information output from the input formatting module 1000 and interleave data in the signal frames in order to obtain additional diversity gain.

The waveform generation module 1300 according to an embodiment of the present invention can convert the signal frames output from the frame structure module 1200 into a signal for transmission. In this case, the waveform generation module 1300 according to an embodiment of the present invention can insert a preamble signal (or preamble) into the signal for detection of the transmission apparatus and insert a reference signal for estimating a transmission channel to compensate for distortion into the signal. In addition, the waveform generation module 1300 according to an embodiment of the present invention can provide a guard interval and insert a specific sequence into the same in order to offset the influence of channel delay spread due to multi-path reception. Additionally, the waveform generation module 1300 according to an embodiment of the present invention can perform a procedure necessary for efficient transmission in consideration of signal characteristics such as a peak-to-average power ratio of the output signal.

The signaling generation module 1400 according to an embodiment of the present invention generates final physical layer signaling information using the input management information and information generated by the input formatting module 1000, coding & modulation module 1100 and frame structure module 1200. Accordingly, a reception apparatus according to an embodiment of the present invention can decode a received signal by decoding the signaling information.

As described above, the apparatus for transmitting broadcast signals for future broadcast services according to one embodiment of the present invention can provide terrestrial broadcast service, mobile broadcast service, UHDTV service, etc. Accordingly, the apparatus for transmitting broadcast signals for future broadcast services according to one embodiment of the present invention can multiplex signals for different services in the time domain and transmit the same.

Figure 2:
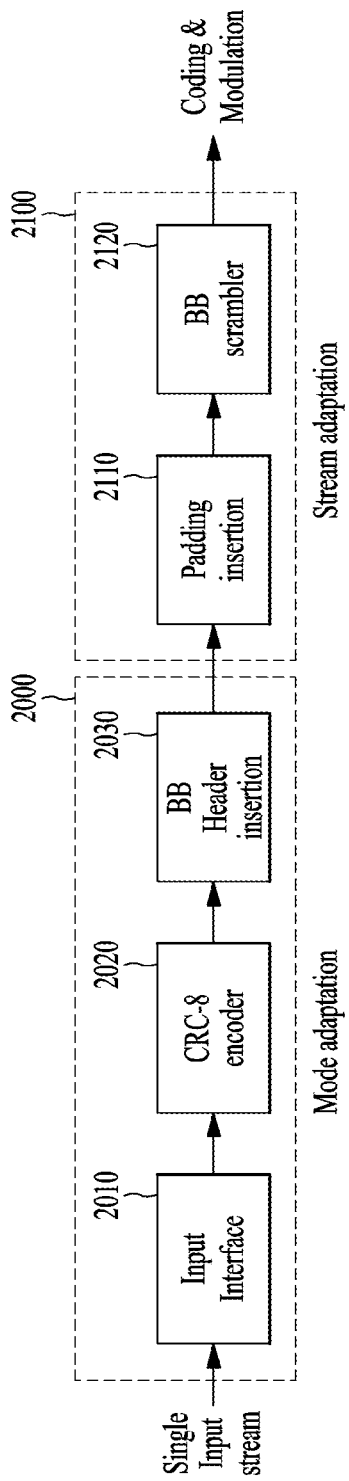
FIG. 2 illustrates an input formatting module according to one embodiment of the present invention.
Figure 3:
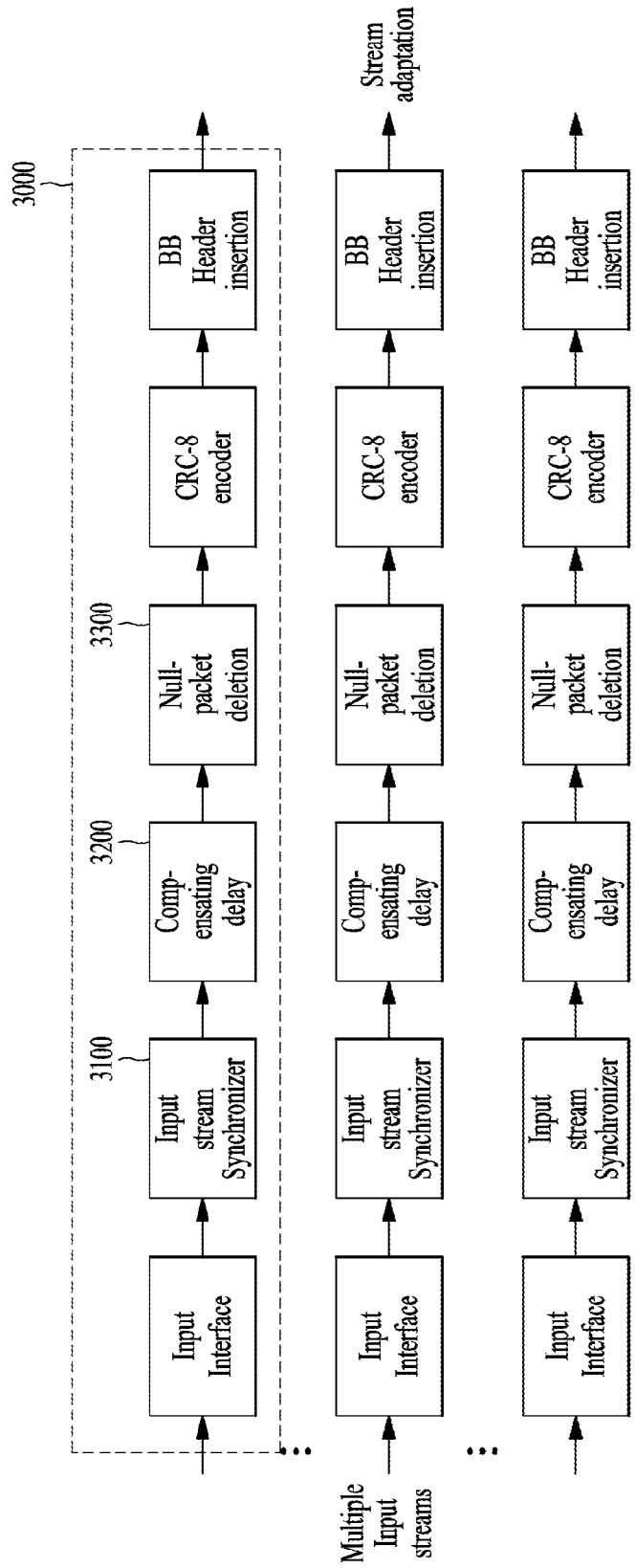
FIG. 3 illustrates an input formatting module according to another embodiment of the present invention.
Figure 4:
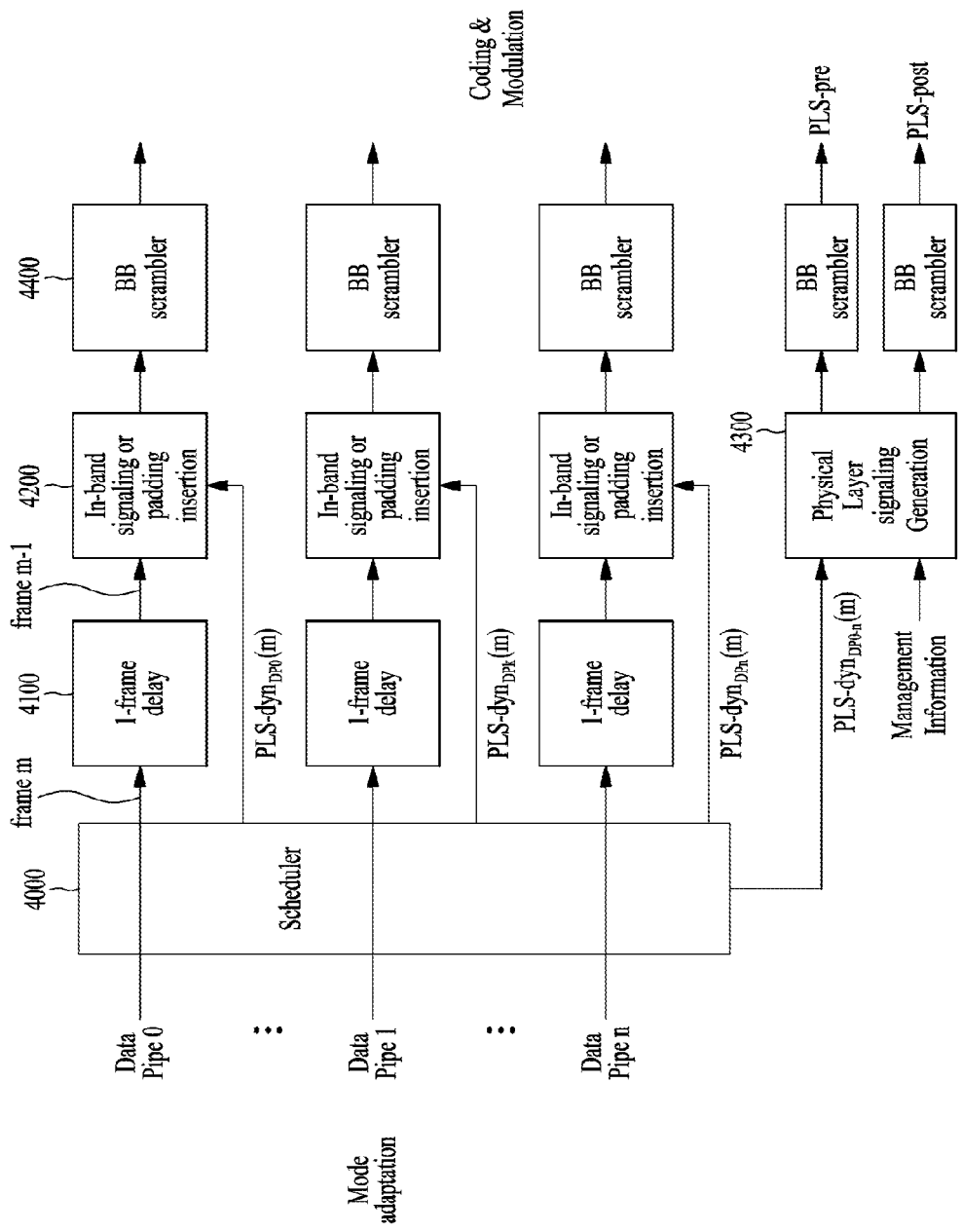
FIG. 4 illustrates an input formatting module according to another embodiment of the present invention.

FIGS. 2, 3 and 4 illustrate the input formatting module 1000 according to embodiments of the present invention. A description will be given of each figure.

FIG. 2 illustrates an input formatting module according to one embodiment of the present invention. FIG. 2 shows an input formatting module when the input signal is a single input stream.

Referring to FIG. 2, the input formatting module according to one embodiment of the present invention can include a mode adaptation module 2000 and a stream adaptation module 2100.

As shown in FIG. 2, the mode adaptation module 2000 can include an input interface block 2010, a CRC-8 encoder block 2020 and a BB header insertion block 2030. Description will be given of each block of the mode adaptation module 2000.

The input interface block 2010 can divide the single input stream input thereto into data pieces each having the length of a baseband (BB) frame used for FEC (BCH/LDPC) which will be performed later and output the data pieces.

The CRC-8 encoder block 2020 can perform CRC encoding on BB frame data to add redundancy data thereto.

The BB header insertion block 2030 can insert, into the BB frame data, a header including information such as mode adaptation type (TS/GS/IP), a user packet length, a data field length, user packet sync byte, start address of user packet sync byte in data field, a high efficiency mode indicator, an input stream synchronization field, etc.

As shown in FIG. 2, the stream adaptation module 2100 can include a padding insertion block 2110 and a BB scrambler block 2120. Description will be given of each block of the stream adaptation module 2100.

If data received from the mode adaptation module 2000 has a length shorter than an input data length necessary for FEC encoding, the padding insertion block 2110 can insert a padding bit into the data such that the data has the input data length and output the data including the padding bit.

The BB scrambler block 2120 can randomize the input bit stream by performing an XOR operation on the input bit stream and a pseudo random binary sequence (PRBS).

The above-described blocks may be omitted or replaced by blocks having similar or identical functions.

As shown in FIG. 2, the input formatting module can finally output data pipes to the coding & modulation module.

FIG. 3 illustrates an input formatting module according to another embodiment of the present invention. FIG. 3 shows a mode adaptation module 3000 of the input formatting module when the input signal corresponds to multiple input streams.

The mode adaptation module 3000 of the input formatting module for processing the multiple input streams can independently process the multiple input streams.

Referring to FIG. 3, the mode adaptation module 3000 for respectively processing the multiple input streams can include input interface blocks, input stream synchronizer blocks 3100, compensating delay blocks 3200, null packet deletion blocks 3300, CRC-8 encoder blocks and BB header insertion blocks. Description will be given of each block of the mode adaptation module 3000.

Operations of the input interface block, CRC-8 encoder block and BB header insertion block correspond to those of the input interface block, CRC-8 encoder block and BB header insertion block described with reference to FIG. 2 and thus description thereof is omitted.

The input stream synchronizer block 3100 can transmit input stream clock reference (ISCR) information to generate timing information necessary for the apparatus for receiving broadcast signals to restore the TSs or GSs.

The compensating delay block 3200 can delay input data and output the delayed input data such that the apparatus for receiving broadcast signals can synchronize the input data if a delay is generated between data pipes according to processing of data including the timing information by the transmission apparatus.

The null packet deletion block 3300 can delete unnecessarily transmitted input null packets from the input data, insert the number of deleted null packets into the input data based on positions in which the null packets are deleted and transmit the input data.

The above-described blocks may be omitted or replaced by blocks having similar or identical functions.

FIG. 4 illustrates an input formatting module according to another embodiment of the present invention.

Specifically, FIG. 4 illustrates a stream adaptation module of the input formatting module when the input signal corresponds to multiple input streams.

The stream adaptation module of the input formatting module when the input signal corresponds to multiple input streams can include a scheduler 4000, a 1-frame delay block 4100, an in-band signaling or padding insertion block 4200, a physical layer signaling generation block 4300 and a BB scrambler block 4400. Description will be given of each block of the stream adaptation module.

The scheduler 4000 can perform scheduling for a MIMO system using multiple antennas having dual polarity. In addition, the scheduler 4000 can generate parameters for use in signal processing blocks for antenna paths, such as a bit-to-cell demux block, a cell interleaver block, a time interleaver block, etc. included in the coding & modulation module illustrated in FIG. 1.

The 1-frame delay block 4100 can delay the input data by one transmission frame such that scheduling information about the next frame can be transmitted through the current frame for in-band signaling information to be inserted into the data pipes.

The in-band signaling or padding insertion block 4200 can insert undelayed physical layer signaling (PLS)-dynamic signaling information into the data delayed by one transmission frame. In this case, the in-band signaling or padding insertion block 4200 can insert a padding bit when a space for padding is present or insert in-band signaling information into the padding space. In addition, the scheduler 4000 can output physical layer signaling-dynamic signaling information about the current frame separately from in-band signaling information. Accordingly, a cell mapper, which will be described later, can map input cells according to scheduling information output from the scheduler 4000.

The physical layer signaling generation block 4300 can generate physical layer signaling data which will be transmitted through a preamble symbol of a transmission frame or spread and transmitted through a data symbol other than the in-band signaling information. In this case, the physical layer signaling data according to an embodiment of the present invention can be referred to as signaling information. Furthermore, the physical layer signaling data according to an embodiment of the present invention can be divided into PLS-pre information and PLS-post information. The PLS-pre information can include parameters necessary to encode the PLS-post information and static PLS signaling data and the PLS-post information can include parameters necessary to encode the data pipes. The parameters necessary to encode the data pipes can be classified into static PLS signaling data and dynamic PLS signaling data. The static PLS signaling data is a parameter commonly applicable to all frames included in a super-frame and can be changed on a super-frame basis. The dynamic PLS signaling data is a parameter differently applicable to respective frames included in a super-frame and can be changed on a frame-by-frame basis. Accordingly, the reception apparatus can acquire the PLS-post information by decoding the PLS-pre information and decode desired data pipes by decoding the PLS-post information.

The BB scrambler block 4400 can generate a pseudo-random binary sequence (PRBS) and perform an XOR operation on the PRBS and the input bit streams to decrease the peak-to-average power ratio (PAPR) of the output signal of the waveform generation block. As shown in FIG. 4, scrambling of the BB scrambler block 4400 is applicable to both data pipes and physical layer signaling information.

The above-described blocks may be omitted or replaced by blocks having similar or identical functions according to designer.

As shown in FIG. 4, the stream adaptation module can finally output the data pipes to the coding & modulation module.

Figure 5:
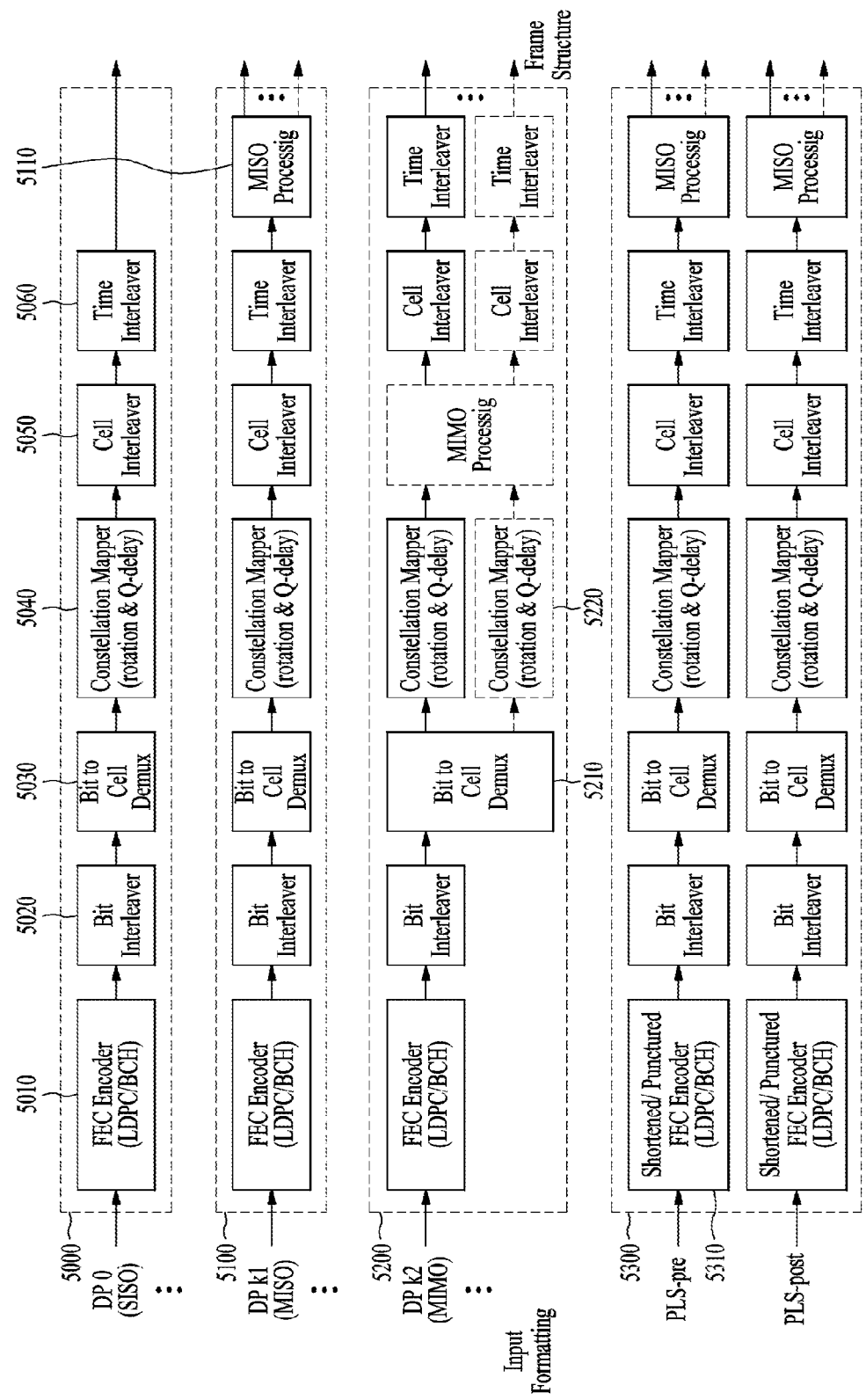
FIG. 5 illustrates a coding & modulation module according to an embodiment of the present invention.

FIG. 5 illustrates a coding & modulation module according to an embodiment of the present invention.

The coding & modulation module shown in FIG. 5 corresponds to an embodiment of the coding & modulation module illustrated in FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the coding & modulation module according to an embodiment of the present invention can independently process data pipes input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each data pipe.

Accordingly, the coding & modulation module according to an embodiment of the present invention can include a first block 5000 for SISO, a second block 5100 for MISO, a third block 5200 for MIMO and a fourth block 5300 for processing the PLS-pre/PLS-post information. The coding & modulation module illustrated in FIG. 5 is an exemplary and may include only the first block 5000 and the fourth block 5300, the second block 5100 and the fourth block 5300 or the third block 5200 and the fourth block 5300 according to design. That is, the coding & modulation module can include blocks for processing data pipes equally or differently according to design.

A description will be given of each block of the coding & modulation module.

The first block 5000 processes an input data pipe according to SISO and can include an FEC encoder block 5010, a bit interleaver block 5020, a bit-to-cell demux block 5030, a constellation mapper block 5040, a cell interleaver block 5050 and a time interleaver block 5060.

The FEC encoder block 5010 can perform BCH encoding and LDPC encoding on the input data pipe to add redundancy thereto such that the reception apparatus can correct an error generated on a transmission channel.

The bit interleaver block 5020 can interleave bit streams of the FEC-encoded data pipe according to an interleaving rule such that the bit streams have robustness against burst error that may be generated on the transmission channel. Accordingly, when deep fading or erasure is applied to QAM symbols, errors can be prevented from being generated in consecutive bits from among all codeword bits since interleaved bits are mapped to the QAM symbols.

The bit-to-cell demux block 5030 can determine the order of input bit streams such that each bit in an FEC block can be transmitted with appropriate robustness in consideration of both the order of input bit streams and a constellation mapping rule.

The constellation mapper block 5040 can map a bit word input thereto to one constellation. In this case, the constellation mapper block 5040 can additionally perform rotation & Q-delay. That is, the constellation mapper block 5040 can rotate input constellations according to a rotation angle, divide the constellations into an in-phase component and a quadrature-phase component and delay only the quadrature-phase component by an arbitrary value. Then, the constellation mapper block 5040 can remap the constellations to new constellations using a paired in-phase component and quadrature-phase component.

The cell interleaver block 5050 can randomly interleave cells corresponding to one FEC block and output the interleaved cells such that cells corresponding to respective FEC blocks can be output in different orders.

The time interleaver block 5060 can interleave cells belonging to a plurality of FEC blocks and output the interleaved cells. Accordingly, the cells corresponding to the FEC blocks are dispersed and transmitted in a period corresponding to a time interleaving depth and thus diversity gain can be obtained.

The second block 5100 processes an input data pipe according to MISO and can include the FEC encoder block, bit interleaver block, bit-to-cell demux block, constellation mapper block, cell interleaver block and time interleaver block in the same manner as the first block 5000. However, the second block 5100 is distinguished from the first block 5000 in that the second block 5100 further includes a MISO processing block 5110. The second block 5100 performs the same procedure including the input operation to the time interleaver operation as those of the first block 5000 and thus description of the corresponding blocks is omitted.

The MISO processing block 5110 can encode input cells according to a MISO encoding matrix providing transmit diversity and output MISO-processed data through two paths. MISO processing according to one embodiment of the present invention can include OSTBC (orthogonal space time block coding)/OSFBC (orthogonal space frequency block coding, Alamouti coding).

The third block 5200 processes an input data pipe according to MIMO and can include the FEC encoder block, bit interleaver block, bit-to-cell demux block, constellation mapper block, cell interleaver block and time interleaver block in the same manner as the second block 5100, as shown in FIG. 5. However, the data processing procedure of the third block 5200 is different from that of the second block 5100 since the third block 5200 includes a MIMO processing block 5220.

That is, in the third block 5200, basic roles of the FEC encoder block and the bit interleaver block are identical to those of the first and second blocks 5000 and 5100 although functions thereof may be different from those of the first and second blocks 5000 and 5100.

The bit-to-cell demux block 5210 can generate as many output bit streams as input bit streams of MIMO processing and output the output bit streams through MIMO paths for MIMO processing. In this case, the bit-to-cell demux block 5210 can be designed to optimize the decoding performance of the reception apparatus in consideration of characteristics of LDPC and MIMO processing.

Basic roles of the constellation mapper block, cell interleaver block and time interleaver block are identical to those of the first and second blocks 5000 and 5100 although functions thereof may be different from those of the first and second blocks 5000 and 5100. As shown in FIG. 5, as many constellation mapper blocks, cell interleaver blocks and time interleaver blocks as the number of MIMO paths for MIMO processing can be present. In this case, the constellation mapper blocks, cell interleaver blocks and time interleaver blocks can operate equally or independently for data input through the respective paths.

The MIMO processing block 5220 can perform MIMO processing on two input cells using a MIMO encoding matrix and output the MIMO-processed data through two paths. The MIMO encoding matrix according to an embodiment of the present invention can include spatial multiplexing, Golden code, full-rate full diversity code, linear dispersion code, etc.

The fourth block 5300 processes the PLS-pre/PLS-post information and can perform SISO or MISO processing.

The basic roles of the bit interleaver block, bit-to-cell demux block, constellation mapper block, cell interleaver block, time interleaver block and MISO processing block included in the fourth block 5300 correspond to those of the second block 5100 although functions thereof may be different from those of the second block 5100.

A shortened/punctured FEC encoder block 5310 included in the fourth block 5300 can process PLS data using an FEC encoding scheme for a PLS path provided for a case in which the length of input data is shorter than a length necessary to perform FEC encoding. Specifically, the shortened/punctured FEC encoder block 5310 can perform BCH encoding on input bit streams, pad 0s corresponding to a desired input bit stream length necessary for normal LDPC encoding, carry out LDPC encoding and then remove the padded 0s to puncture parity bits such that an effective code rate becomes equal to or lower than the data pipe rate.

The blocks included in the first block 5000 to fourth block 5300 may be omitted or replaced by blocks having similar or identical functions according to design.

As illustrated in FIG. 5, the coding & modulation module can output the data pipes (or DP data), PLS-pre information and PLS-post information processed for the respective paths to the frame structure module.

Figure 6:
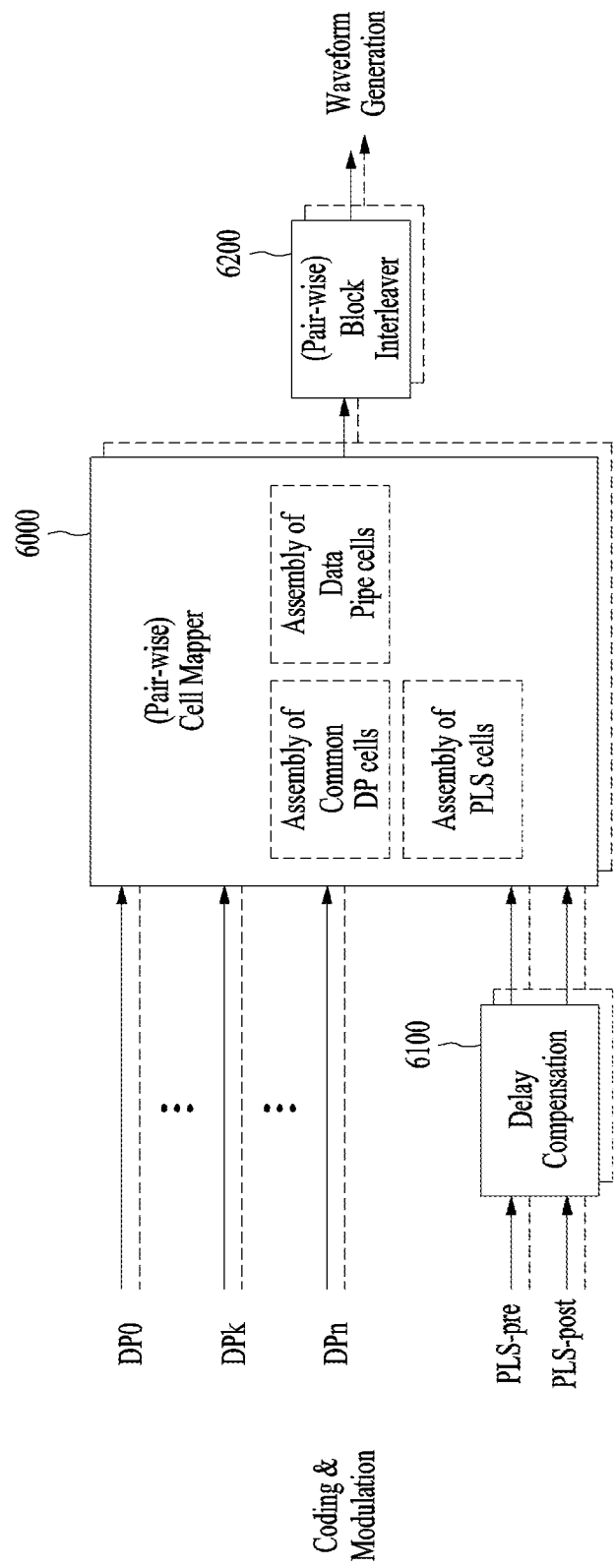
FIG. 6 illustrates a frame structure module according to one embodiment of the present invention.

FIG. 6 illustrates a frame structure module according to one embodiment of the present invention.

The frame structure module shown in FIG. 6 corresponds to an embodiment of the frame structure module 1200 illustrated in FIG. 1.

The frame structure module according to one embodiment of the present invention can include at least one cell-mapper 6000, at least one delay compensation module 6100 and at least one block interleaver 6200. The number of cell mappers 6000, delay compensation modules 6100 and block interleavers 6200 can be changed. A description will be given of each module of the frame structure block.

The cell-mapper 6000 can allocate cells corresponding to SISO-, MISO- or MIMO-processed data pipes output from the coding & modulation module, cells corresponding to common data commonly applicable to the data pipes and cells corresponding to the PLS-pre/PLS-post information to signal frames according to scheduling information. The common data refers to signaling information commonly applied to all or some data pipes and can be transmitted through a specific data pipe. The data pipe through which the common data is transmitted can be referred to as a common data pipe and can be changed according to design.

When the apparatus for transmitting broadcast signals according to an embodiment of the present invention uses two output antennas and Alamouti coding is used for MISO processing, the cell-mapper 6000 can perform pair-wise cell mapping in order to maintain orthogonality according to Alamouti encoding. That is, the cell-mapper 6000 can process two consecutive cells of the input cells as one unit and map the unit to a frame. Accordingly, paired cells in an input path corresponding to an output path of each antenna can be allocated to neighboring positions in a transmission frame.

The delay compensation block 6100 can obtain PLS data corresponding to the current transmission frame by delaying input PLS data cells for the next transmission frame by one frame. In this case, the PLS data corresponding to the current frame can be transmitted through a preamble part in the current signal frame and PLS data corresponding to the next signal frame can be transmitted through a preamble part in the current signal frame or in-band signaling in each data pipe of the current signal frame. This can be changed by the designer.

The block interleaver 6200 can obtain additional diversity gain by interleaving cells in a transport block corresponding to the unit of a signal frame. In addition, the block interleaver 6200 can perform interleaving by processing two consecutive cells of the input cells as one unit when the above-described pair-wise cell mapping is performed. Accordingly, cells output from the block interleaver 6200 can be two consecutive identical cells.

When pair-wise mapping and pair-wise interleaving are performed, at least one cell mapper and at least one block interleaver can operate equally or independently for data input through the paths.

The above-described blocks may be omitted or replaced by blocks having similar or identical functions according to design.

Figure 7:
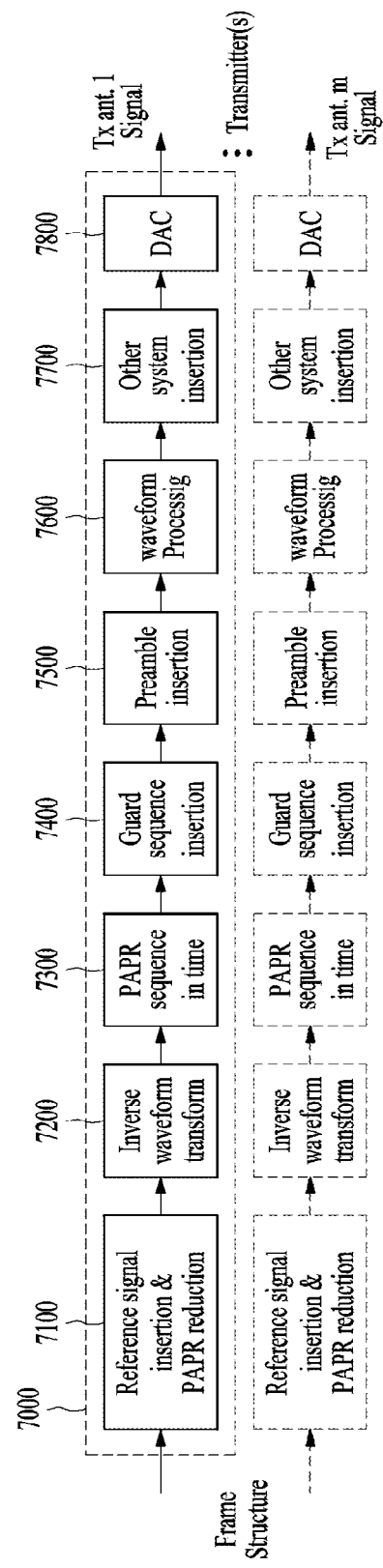
FIG. 7 illustrates a waveform generation module according to an embodiment of the present invention.

FIG. 7 illustrates a waveform generation module according to an embodiment of the present invention.

The waveform generation module illustrated in FIG. 7 corresponds to an embodiment of the waveform generation module 1300 described with reference to FIG. 1.

The waveform generation module according to an embodiment of the present invention can modulate and transmit as many signal frames as the number of antennas for receiving and outputting signal frames output from the frame structure module illustrated in FIG. 6.

Specifically, the waveform generation module illustrated in FIG. 7 is an embodiment of a waveform generation module of an apparatus for transmitting broadcast signals using m Tx antennas and can include m processing blocks for modulating and outputting frames corresponding to m paths. The m processing blocks can perform the same processing procedure. A description will be given of operation of the first processing block 7000 from among the m processing blocks.

The first processing block 7000 can include a reference signal insertion & PAPR reduction block 7100, an inverse waveform transform block 7200, a PAPR reduction in time block 7300, a guard sequence insertion block 7400, a preamble insertion block 7500, a waveform processing block 7600, other system insertion block 7700 and a DAC (digital analog converter) block 7800.

The reference signal insertion & PAPR reduction block 7100 can insert a reference signal into a predetermined position of each signal block and apply a PAPR reduction scheme to reduce a PAPR in the time domain. If a broadcast transmission/reception system according to an embodiment of the present invention corresponds to an OFDM system, the reference signal insertion & PAPR reduction block 7100 can use a method of reserving some active subcarriers rather than using the same. In addition, the reference signal insertion & PAPR reduction block 7100 may not use the PAPR reduction scheme as an optional feature according to broadcast transmission/reception system.

The inverse waveform transform block 7200 can transform an input signal in a manner of improving transmission efficiency and flexibility in consideration of transmission channel characteristics and system architecture. If the broadcast transmission/reception system according to an embodiment of the present invention corresponds to an OFDM system, the inverse waveform transform block 7200 can employ a method of transforming a frequency domain signal into a time domain signal through inverse FFT operation. If the broadcast transmission/reception system according to an embodiment of the present invention corresponds to a single carrier system, the inverse waveform transform block 7200 may not be used in the waveform generation module.

The PAPR reduction in time block 7300 can use a method for reducing PAPR of an input signal in the time domain. If the broadcast transmission/reception system according to an embodiment of the present invention corresponds to an OFDM system, the PAPR reduction in time block 7300 may use a method of simply clipping peak amplitude. Furthermore, the PAPR reduction in time block 7300 may not be used in the broadcast transmission/reception system according to an embodiment of the present invention since it is an optional feature.

The guard sequence insertion block 7400 can provide a guard interval between neighboring signal blocks and insert a specific sequence into the guard interval as necessary in order to minimize the influence of delay spread of a transmission channel. Accordingly, the reception apparatus can easily perform synchronization or channel estimation. If the broadcast transmission/reception system according to an embodiment of the present invention corresponds to an OFDM system, the guard sequence insertion block 7400 may insert a cyclic prefix into a guard interval of an OFDM symbol.

The preamble insertion block 7500 can insert a signal of a known type (e.g. the preamble or preamble symbol) agreed upon between the transmission apparatus and the reception apparatus into a transmission signal such that the reception apparatus can rapidly and efficiently detect a target system signal. If the broadcast transmission/reception system according to an embodiment of the present invention corresponds to an OFDM system, the preamble insertion block 7500 can define a signal frame composed of a plurality of OFDM symbols and insert a preamble symbol into the beginning of each signal frame. That is, the preamble carries basic PLS data and is located in the beginning of a signal frame.

The waveform processing block 7600 can perform waveform processing on an input baseband signal such that the input baseband signal meets channel transmission characteristics. The waveform processing block 7600 may use a method of performing square-root-raised cosine (SRRC) filtering to obtain a standard for out-of-band emission of a transmission signal. If the broadcast transmission/reception system according to an embodiment of the present invention corresponds to a multi-carrier system, the waveform processing block 7600 may not be used.

The other system insertion block 7700 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 7800 can convert an input digital signal into an analog signal and output the analog signal. The signal output from the DAC block 7800 can be transmitted through m output antennas. A Tx antenna according to an embodiment of the present invention can have vertical or horizontal polarity.

The above-described blocks may be omitted or replaced by blocks having similar or identical functions according to design.

Figure 8:
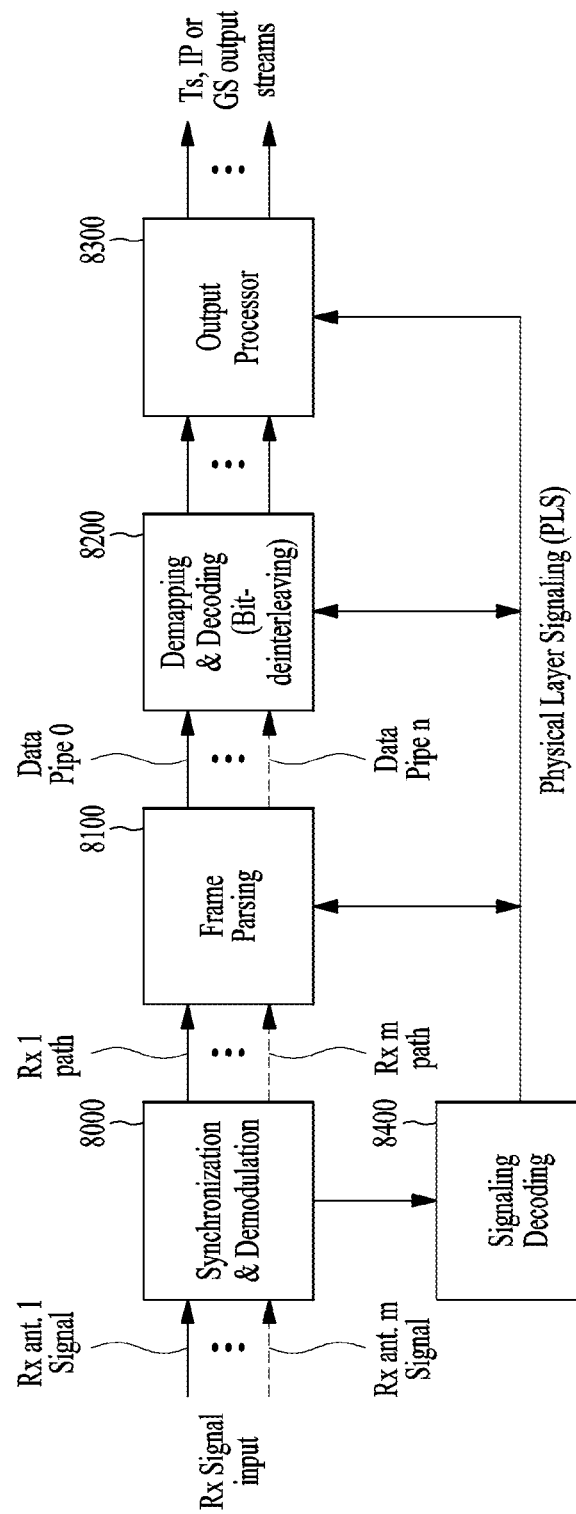
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1. The apparatus for receiving broadcast signals for future broadcast services according to an embodiment of the present invention can include a synchronization & demodulation module 8000, a frame parsing module 8100, a demapping & decoding module 8200, an output processor 8300 and a signaling decoding module 8400. A description will be given of operation of each module of the apparatus for receiving broadcast signals.

The synchronization & demodulation module 8000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 8100 can parse input signal frames and extract data through which a service selected by a user is transmitted. If the apparatus for transmitting broadcast signals performs interleaving, the frame parsing module 8100 can carry out deinterleaving corresponding to a reverse procedure of interleaving. In this case, the positions of a signal and data that need to be extracted can be obtained by decoding data output from the signaling decoding module 8400 to restore scheduling information generated by the apparatus for transmitting broadcast signals.

The demapping & decoding module 8200 can convert the input signals into bit domain data and then deinterleave the same as necessary. The demapping & decoding module 8200 can perform demapping for mapping applied for transmission efficiency and correct an error generated on a transmission channel through decoding. In this case, the demapping & decoding module 8200 can obtain transmission parameters necessary for demapping and decoding by decoding the data output from the signaling decoding module 8400.

The output processor 8300 can perform reverse procedures of various compression/signal processing procedures which are applied by the apparatus for transmitting broadcast signals to improve transmission efficiency. In this case, the output processor 8300 can acquire necessary control information from data output from the signaling decoding module 8400. The output of the output processor 8300 corresponds to a signal input to the apparatus for transmitting broadcast signals and may be MPEG-TSs, IP streams (v4 or v6) and generic streams.

The signaling decoding module 8400 can obtain PLS information from the signal demodulated by the synchronization & demodulation module 8000. As described above, the frame parsing module 8100, demapping & decoding module 8200 and output processor 8300 can execute functions thereof using the data output from the signaling decoding module 8400.

Figure 9:
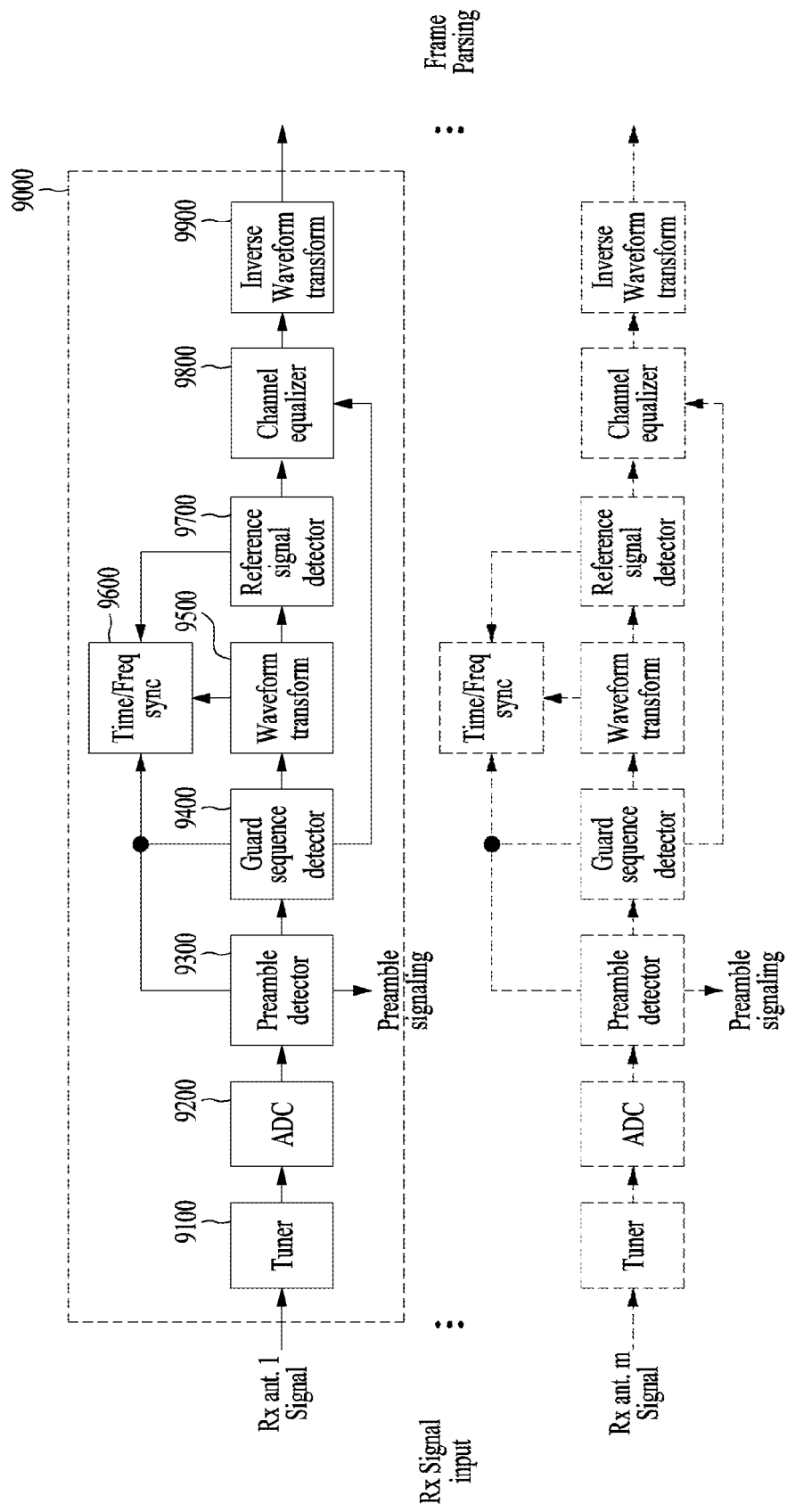
FIG. 9 illustrates a synchronization & demodulation module according to an embodiment of the present invention.

FIG. 9 illustrates a synchronization & demodulation module according to an embodiment of the present invention.

The synchronization & demodulation module shown in FIG. 9 corresponds to an embodiment of the synchronization & demodulation module described with reference to FIG. 8. The synchronization & demodulation module shown in FIG. 9 can perform a reverse operation of the operation of the waveform generation module illustrated in FIG. 7.

As shown in FIG. 9, the synchronization & demodulation module according to an embodiment of the present invention corresponds to a synchronization & demodulation module of an apparatus for receiving broadcast signals using m Rx antennas and can include m processing blocks for demodulating signals respectively input through m paths. The m processing blocks can perform the same processing procedure. A description will be given of operation of the first processing block 9000 from among the m processing blocks.

The first processing block 9000 can include a tuner 9100, an ADC block 9200, a preamble detector 9300, a guard sequence detector 9400, a waveform transform block 9500, a time/frequency synchronization block 9600, a reference signal detector 9700, a channel equalizer 9800 and an inverse waveform transform block 9900.

The tuner 9100 can select a desired frequency band, compensate for the magnitude of a received signal and output the compensated signal to the ADC block 9200.

The ADC block 9200 can convert the signal output from the tuner 9100 into a digital signal.

The preamble detector 9300 can detect a preamble (or preamble signal or preamble symbol) in order to check whether or not the digital signal is a signal of the system corresponding to the apparatus for receiving broadcast signals. In this case, the preamble detector 9300 can decode basic transmission parameters received through the preamble.

The guard sequence detector 9400 can detect a guard sequence in the digital signal. The time/frequency synchronization block 9600 can perform time/frequency synchronization using the detected guard sequence and the channel equalizer 9800 can estimate a channel through a received/restored sequence using the detected guard sequence.

The waveform transform block 9500 can perform a reverse operation of inverse waveform transform when the apparatus for transmitting broadcast signals has performed inverse waveform transform. When the broadcast transmission/reception system according to one embodiment of the present invention is a multi-carrier system, the waveform transform block 9500 can perform FFT. Furthermore, when the broadcast transmission/reception system according to an embodiment of the present invention is a single carrier system, the waveform transform block 9500 may not be used if a received time domain signal is processed in the frequency domain or processed in the time domain.

The time/frequency synchronization block 9600 can receive output data of the preamble detector 9300, guard sequence detector 9400 and reference signal detector 9700 and perform time synchronization and carrier frequency synchronization including guard sequence detection and block window positioning on a detected signal. Here, the time/frequency synchronization block 9600 can feed back the output signal of the waveform transform block 9500 for frequency synchronization.

The reference signal detector 9700 can detect a received reference signal. Accordingly, the apparatus for receiving broadcast signals according to an embodiment of the present invention can perform synchronization or channel estimation.

The channel equalizer 9800 can estimate a transmission channel from each Tx antenna to each Rx antenna from the guard sequence or reference signal and perform channel equalization for received data using the estimated channel.

The inverse waveform transform block 9900 may restore the original received data domain when the waveform transform block 9500 performs waveform transform for efficient synchronization and channel estimation/equalization. If the broadcast transmission/reception system according to an embodiment of the present invention is a single carrier system, the waveform transform block 9500 can perform FFT in order to carry out synchronization/channel estimation/equalization in the frequency domain and the inverse waveform transform block 9900 can perform IFFT on the channel-equalized signal to restore transmitted data symbols. If the broadcast transmission/reception system according to an embodiment of the present invention is a multi-carrier system, the inverse waveform transform block 9900 may not be used.

The above-described blocks may be omitted or replaced by blocks having similar or identical functions according to design.

Figure 10:
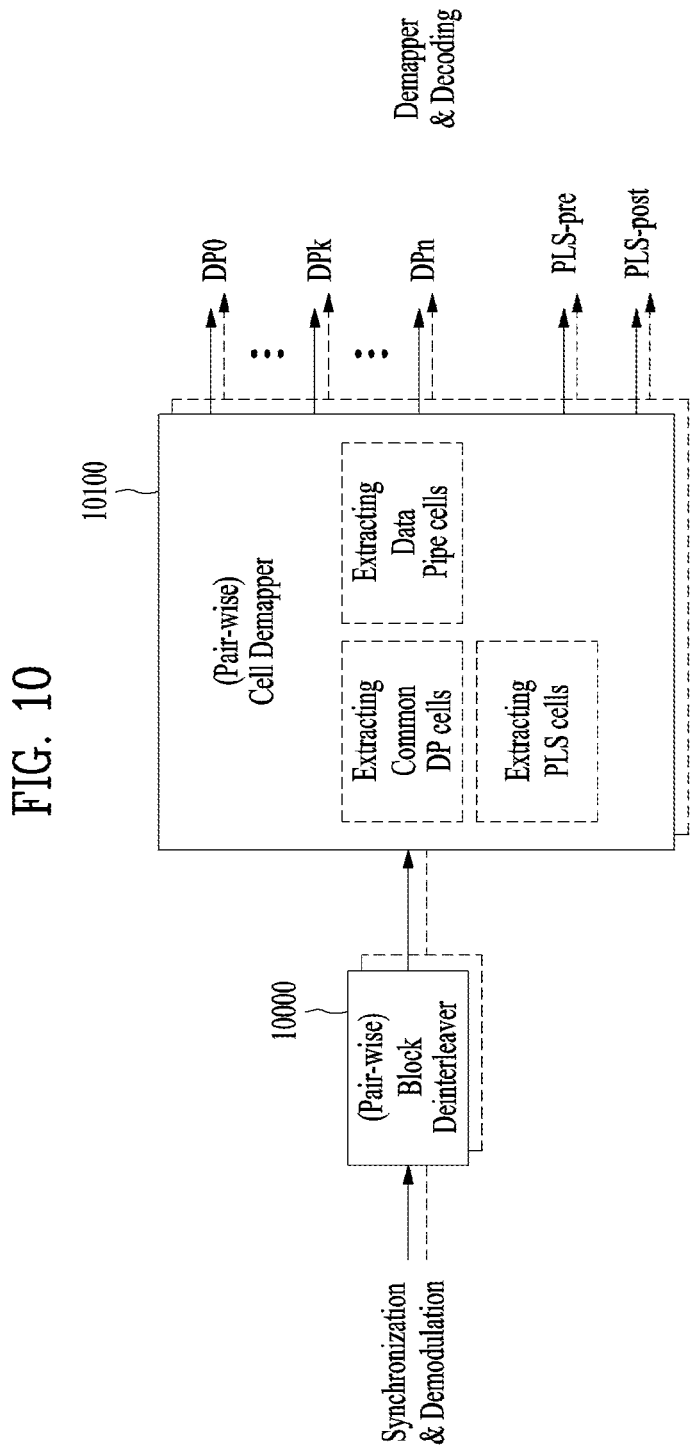
FIG. 10 illustrates a frame parsing module according to an embodiment of the present invention.

FIG. 10 illustrates a frame parsing module according to an embodiment of the present invention.

The frame parsing module illustrated in FIG. 10 corresponds to an embodiment of the frame parsing module described with reference to FIG. 8. The frame parsing module shown in FIG. 10 can perform a reverse operation of the operation of the frame structure module illustrated in FIG. 6.

As shown in FIG. 10, the frame parsing module according to an embodiment of the present invention can include at least one block interleaver 10000 and at least one cell demapper 10100.

The block interleaver 10000 can deinterleave data input through data paths of the m Rx antennas and processed by the synchronization & demodulation module on a signal block basis. In this case, if the apparatus for transmitting broadcast signals performs pair-wise interleaving as illustrated in FIG. 8, the block interleaver 10000 can process two consecutive pieces of data as a pair for each input path. Accordingly, the block interleaver 10000 can output two consecutive pieces of data even when deinterleaving has been performed. Furthermore, the block interleaver 10000 can perform a reverse operation of the interleaving operation performed by the apparatus for transmitting broadcast signals to output data in the original order.

The cell demapper 10100 can extract cells corresponding to common data, cells corresponding to data pipes and cells corresponding to PLS data from received signal frames. The cell demapper 10100 can merge data distributed and transmitted and output the same as a stream as necessary. When two consecutive pieces of cell input data are processed as a pair and mapped in the apparatus for transmitting broadcast signals, as shown in FIG. 6, the cell demapper 10100 can perform pair-wise cell demapping for processing two consecutive input cells as one unit as a reverse procedure of the mapping operation of the apparatus for transmitting broadcast signals.

In addition, the cell demapper 10100 can extract PLS signaling data received through the current frame as PLS-pre & PLS-post data and output the PLS-pre & PLS-post data.

The above-described blocks may be omitted or replaced by blocks having similar or identical functions according to design.

Figure 11:
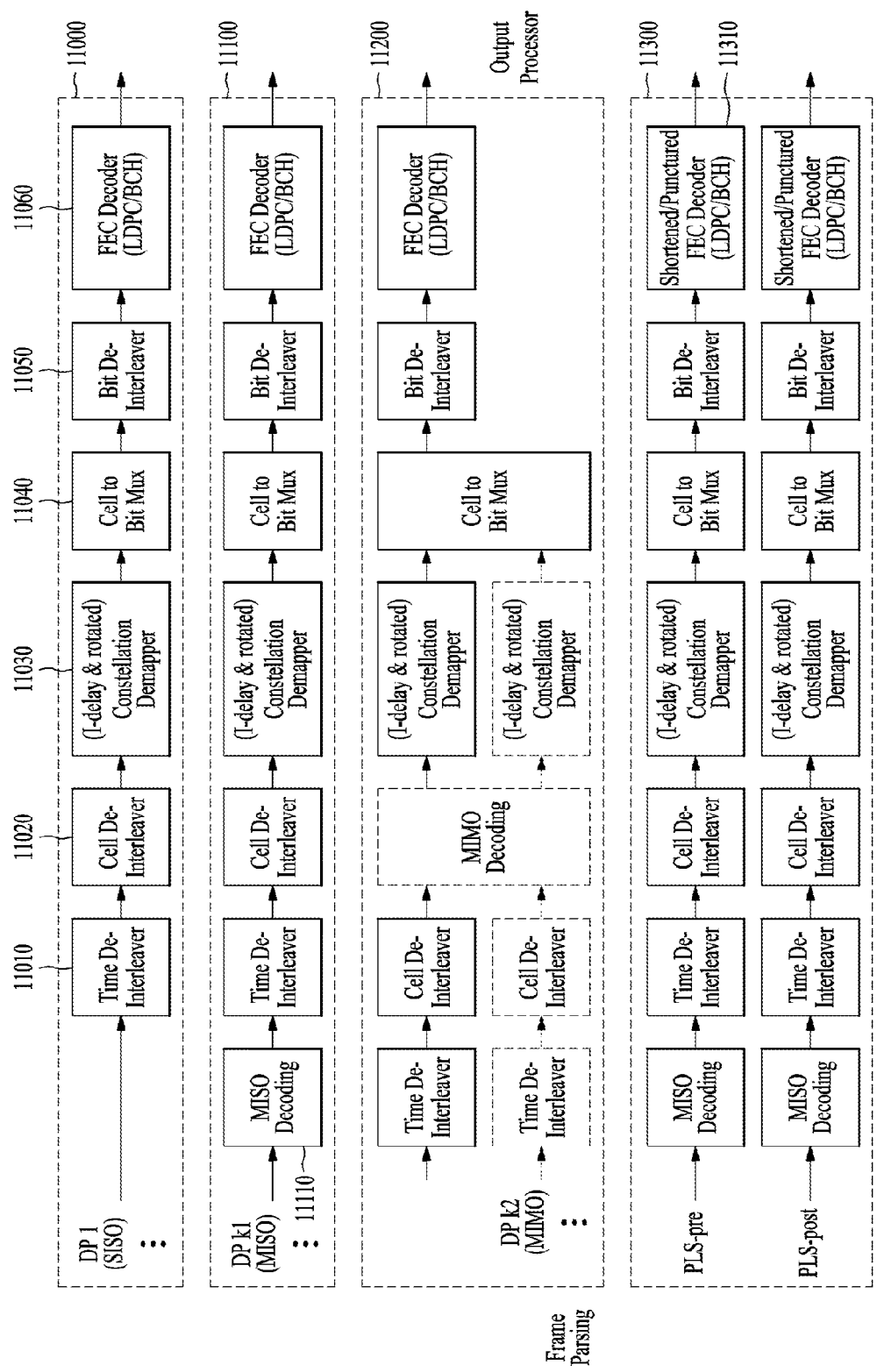
FIG. 11 illustrates a demapping & decoding module according to an embodiment of the present invention.

FIG. 11 illustrates a demapping & decoding module according to an embodiment of the present invention.

The demapping & decoding module shown in FIG. 11 corresponds to an embodiment of the demapping & decoding module illustrated in FIG. 8. The demapping & decoding module shown in FIG. 11 can perform a reverse operation of the operation of the coding & modulation module illustrated in FIG. 5.

The coding & modulation module of the apparatus for transmitting broadcast signals according to an embodiment of the present invention can process input data pipes by independently applying SISO, MISO and MIMO thereto for respective paths, as described above. Accordingly, the demapping & decoding module illustrated in FIG. 11 can include blocks for processing data output from the frame parsing module according to SISO, MISO and MIMO in response to the apparatus for transmitting broadcast signals.

As shown in FIG. 11, the demapping & decoding module according to an embodiment of the present invention can include a first block 11000 for SISO, a second block 11100 for MISO, a third block 11200 for MIMO and a fourth block 11300 for processing the PLS-pre/PLS-post information. The demapping & decoding module shown in FIG. 11 is exemplary and may include only the first block 11000 and the fourth block 11300, only the second block 11100 and the fourth block 11300 or only the third block 11200 and the fourth block 11300 according to design. That is, the demapping & decoding module can include blocks for processing data pipes equally or differently according to design.

A description will be given of each block of the demapping & decoding module.

The first block 11000 processes an input data pipe according to SISO and can include a time deinterleaver block 11010, a cell deinterleaver block 11020, a constellation demapper block 11030, a cell-to-bit mux block 11040, a bit deinterleaver block 11050 and an FEC decoder block 11060.

The time deinterleaver block 11010 can perform a reverse process of the process performed by the time interleaver block 5060 illustrated in FIG. 5. That is, the time deinterleaver block 11010 can deinterleave input symbols interleaved in the time domain into original positions thereof.

The cell deinterleaver block 11020 can perform a reverse process of the process performed by the cell interleaver block 5050 illustrated in FIG. 5. That is, the cell deinterleaver block 11020 can deinterleave positions of cells spread in one FEC block into original positions thereof.

The constellation demapper block 11030 can perform a reverse process of the process performed by the constellation mapper block 5040 illustrated in FIG. 5. That is, the constellation demapper block 11030 can demap a symbol domain input signal to bit domain data. In addition, the constellation demapper block 11030 may perform hard decision and output decided bit data. Furthermore, the constellation demapper block 11030 may output a log-likelihood ratio (LLR) of each bit, which corresponds to a soft decision value or probability value. If the apparatus for transmitting broadcast signals applies a rotated constellation in order to obtain additional diversity gain, the constellation demapper block 11030 can perform 2-dimensional LLR demapping corresponding to the rotated constellation. Here, the constellation demapper block 11030 can calculate the LLR such that a delay applied by the apparatus for transmitting broadcast signals to the I or Q component can be compensated.

The cell-to-bit mux block 11040 can perform a reverse process of the process performed by the bit-to-cell demux block 5030 illustrated in FIG. 5. That is, the cell-to-bit mux block 11040 can restore bit data mapped by the bit-to-cell demux block 5030 to the original bit streams.

The bit deinterleaver block 11050 can perform a reverse process of the process performed by the bit interleaver 5020 illustrated in FIG. 5. That is, the bit deinterleaver block 11050 can deinterleave the bit streams output from the cell-to-bit mux block 11040 in the original order.

The FEC decoder block 11060 can perform a reverse process of the process performed by the FEC encoder block 5010 illustrated in FIG. 5. That is, the FEC decoder block 11060 can correct an error generated on a transmission channel by performing LDPC decoding and BCH decoding.

The second block 11100 processes an input data pipe according to MISO and can include the time deinterleaver block, cell deinterleaver block, constellation demapper block, cell-to-bit mux block, bit deinterleaver block and FEC decoder block in the same manner as the first block 11000, as shown in FIG. 11. However, the second block 11100 is distinguished from the first block 11000 in that the second block 11100 further includes a MISO decoding block 11110. The second block 11100 performs the same procedure including time deinterleaving operation to outputting operation as the first block 11000 and thus description of the corresponding blocks is omitted.

The MISO decoding block 11110 can perform a reverse operation of the operation of the MISO processing block 5110 illustrated in FIG. 5. If the broadcast transmission/reception system according to an embodiment of the present invention uses STBC, the MISO decoding block 11110 can perform Alamouti decoding.

The third block 11200 processes an input data pipe according to MIMO and can include the time deinterleaver block, cell deinterleaver block, constellation demapper block, cell-to-bit mux block, bit deinterleaver block and FEC decoder block in the same manner as the second block 11100, as shown in FIG. 11. However, the third block 11200 is distinguished from the second block 11100 in that the third block 11200 further includes a MIMO decoding block 11210. The basic roles of the time deinterleaver block, cell deinterleaver block, constellation demapper block, cell-to-bit mux block and bit deinterleaver block included in the third block 11200 are identical to those of the corresponding blocks included in the first and second blocks 11000 and 11100 although functions thereof may be different from the first and second blocks 11000 and 11100.

The MIMO decoding block 11210 can receive output data of the cell deinterleaver for input signals of the m Rx antennas and perform MIMO decoding as a reverse operation of the operation of the MIMO processing block 5220 illustrated in FIG. 5. The MIMO decoding block 11210 can perform maximum likelihood decoding to obtain optimal decoding performance or carry out sphere decoding with reduced complexity. Otherwise, the MIMO decoding block 11210 can achieve improved decoding performance by performing MMSE detection or carrying out iterative decoding with MMSE detection.

The fourth block 11300 processes the PLS-pre/PLS-post information and can perform SISO or MISO decoding. The fourth block 11300 can carry out a reverse process of the process performed by the fourth block 5300 described with reference to FIG. 5.

The basic roles of the time deinterleaver block, cell deinterleaver block, constellation demapper block, cell-to-bit mux block and bit deinterleaver block included in the fourth block 11300 are identical to those of the corresponding blocks of the first, second and third blocks 11000, 11100 and 11200 although functions thereof may be different from the first, second and third blocks 11000, 11100 and 11200.

The shortened/punctured FEC decoder 11310 included in the fourth block 11300 can perform a reverse process of the process performed by the shortened/punctured FEC encoder block 5310 described with reference to FIG. 5. That is, the shortened/punctured FEC decoder 11310 can perform de-shortening and de-puncturing on data shortened/punctured according to PLS data length and then carry out FEC decoding thereon. In this case, the FEC decoder used for data pipes can also be used for PLS. Accordingly, additional FEC decoder hardware for the PLS only is not needed and thus system design is simplified and efficient coding is achieved.

The above-described blocks may be omitted or replaced by blocks having similar or identical functions according to design.

The demapping & decoding module according to an embodiment of the present invention can output data pipes and PLS information processed for the respective paths to the output processor, as illustrated in FIG. 11.

Figure 12:
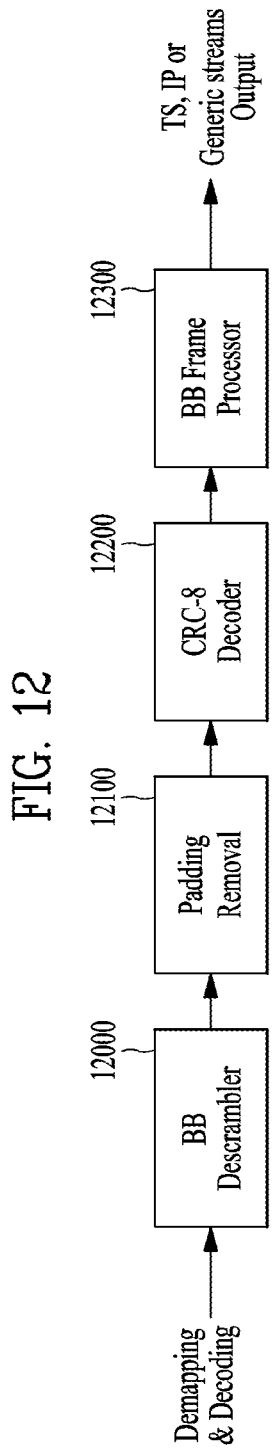
FIG. 12 illustrates an output processor according to an embodiment of the present invention.
Figure 13:
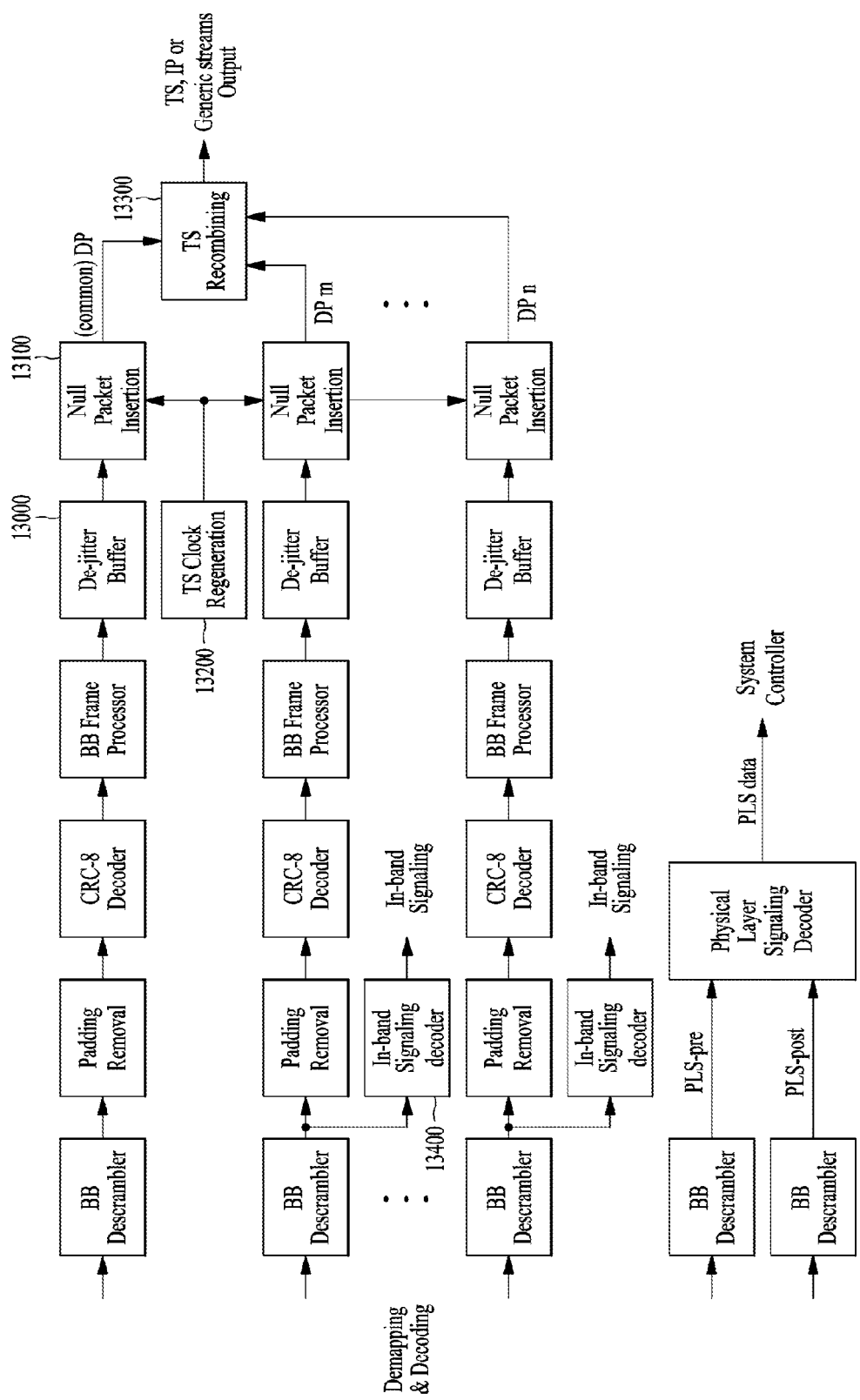
FIG. 13 illustrates an output processor according to another embodiment of the present invention.

FIGS. 12 and 13 illustrate output processors according to embodiments of the present invention.

FIG. 12 illustrates an output processor according to an embodiment of the present invention.

The output processor illustrated in FIG. 12 corresponds to an embodiment of the output processor illustrated in FIG. 8. The output processor illustrated in FIG. 12 receives a single data pipe output from the demapping & decoding module and outputs a single output stream. The output processor can perform a reverse operation of the operation of the input formatting module illustrated in FIG. 2.

The output processor shown in FIG. 12 can include a BB scrambler block 12000, a padding removal block 12100, a CRC-8 decoder block 12200 and a BB frame processor block 12300.

The BB scrambler block 12000 can descramble an input bit stream by generating the same PRBS as that used in the apparatus for transmitting broadcast signals for the input bit stream and carrying out an XOR operation on the PRBS and the bit stream.

The padding removal block 12100 can remove padding bits inserted by the apparatus for transmitting broadcast signals as necessary.

The CRC-8 decoder block 12200 can check a block error by performing CRC decoding on the bit stream received from the padding removal block 12100.

The BB frame processor block 12300 can decode information transmitted through a BB frame header and restore MPEG-TSs, IP streams (v4 or v6) or generic streams using the decoded information.

The above-described blocks may be omitted or replaced by blocks having similar or identical functions according to design.

FIG. 13 illustrates an output processor according to another embodiment of the present invention.

The output processor shown in FIG. 13 corresponds to an embodiment of the output processor illustrated in FIG. 8. The output processor shown in FIG. 13 receives multiple data pipes output from the demapping & decoding module. Decoding multiple data pipes can include a process of merging common data commonly applicable to a plurality of data pipes and data pipes related thereto and decoding the same or a process of simultaneously decoding a plurality of services or service components (including a scalable video service) by the apparatus for receiving broadcast signals.

The output processor shown in FIG. 13 can include a BB descrambler block, a padding removal block, a CRC-8 decoder block and a BB frame processor block as the output processor illustrated in FIG. 12. The basic roles of these blocks correspond to those of the blocks described with reference to FIG. 12 although operations thereof may differ from those of the blocks illustrated in FIG. 12.

A de jitter buffer block 13000 included in the output processor shown in FIG. 13 can compensate for a delay, inserted by the apparatus for transmitting broadcast signals for synchronization of multiple data pipes, according to a restored TTO (time to output) parameter.

A null packet insertion block 13100 can restore a null packet removed from a stream with reference to a restored DNP (deleted null packet) and output common data.

A TS clock regeneration block 13200 can restore time synchronization of output packets based on ISCR (input stream time reference) information.

A TS recombining block 13300 can recombine the common data and data pipes related thereto, output from the null packet insertion block 13100, to restore the original MPEG-TSs, IP streams (v4 or v6) or generic streams. The TTO, DNT and ISCR information can be obtained through the BB frame header.

An in-band signaling decoding block 13400 can decode and output in-band physical layer signaling information transmitted through a padding bit field in each FEC frame of a data pipe.

The output processor shown in FIG. 13 can BB-descramble the PLS-pre information and PLS-post information respectively input through a PLS-pre path and a PLS-post path and decode the descrambled data to restore the original PLS data. The restored PLS data is delivered to a system controller included in the apparatus for receiving broadcast signals. The system controller can provide parameters necessary for the synchronization & demodulation module, frame parsing module, demapping & decoding module and output processor module of the apparatus for receiving broadcast signals.

The above-described blocks may be omitted or replaced by blocks having similar r identical functions according to design.

Figure 14:
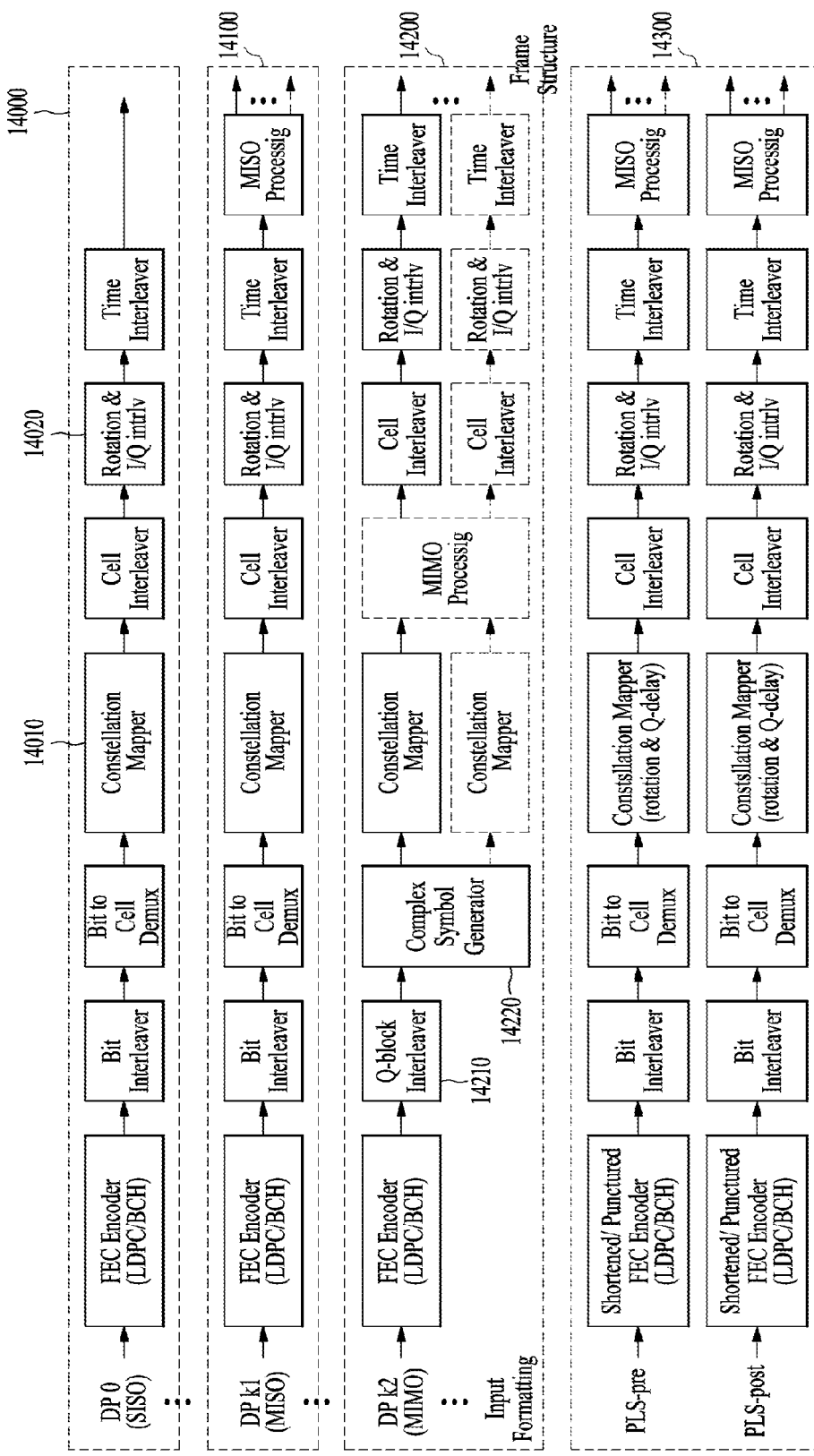
FIG. 14 illustrates a coding & modulation module according to another embodiment of the present invention.

FIG. 14 illustrates a coding & modulation module according to another embodiment of the present invention.

The coding & modulation module shown in FIG. 14 corresponds to another embodiment of the coding & modulation module illustrated in FIGS. 1 to 5.

To control QoS for each service or service component transmitted through each data pipe, as described above with reference to FIG. 5, the coding & modulation module shown in FIG. 14 can include a first block 14000 for SISO, a second block 14100 for MISO, a third block 14200 for MIMO and a fourth block 14300 for processing the PLS-pre/PLS-post information. In addition, the coding & modulation module can include blocks for processing data pipes equally or differently according to the design. The first to fourth blocks 14000 to 14300 shown in FIG. 14 are similar to the first to fourth blocks 5000 to 5300 illustrated in FIG. 5.

However, the first to fourth blocks 14000 to 14300 shown in FIG. 14 are distinguished from the first to fourth blocks 5000 to 5300 illustrated in FIG. 5 in that a constellation mapper 14010 included in the first to fourth blocks 14000 to 14300 has a function different from the first to fourth blocks 5000 to 5300 illustrated in FIG. 5, a rotation & I/Q interleaver block 14020 is present between the cell interleaver and the time interleaver of the first to fourth blocks 14000 to 14300 illustrated in FIG. 14 and the third block 14200 for MIMO has a configuration different from the third block 5200 for MIMO illustrated in FIG. 5. The following description focuses on these differences between the first to fourth blocks 14000 to 14300 shown in FIG. 14 and the first to fourth blocks 5000 to 5300 illustrated in FIG. 5.

The constellation mapper block 14010 shown in FIG. 14 can map an input bit word to a complex symbol. However, the constellation mapper block 14010 may not perform constellation rotation, differently from the constellation mapper block shown in FIG. 5. The constellation mapper block 14010 shown in FIG. 14 is commonly applicable to the first, second and third blocks 14000, 14100 and 14200, as described above.

The rotation & I/Q interleaver block 14020 can independently interleave in-phase and quadrature-phase components of each complex symbol of cell-interleaved data output from the cell interleaver and output the in-phase and quadrature-phase components on a symbol-by-symbol basis. The number of number of input data pieces and output data pieces of the rotation & I/Q interleaver block 14020 is two or more which can be changed by the designer. In addition, the rotation & I/Q interleaver block 14020 may not interleave the in-phase component.

The rotation & I/Q interleaver block 14020 is commonly applicable to the first to fourth blocks 14000 to 14300, as described above. In this case, whether or not the rotation & I/Q interleaver block 14020 is applied to the fourth block 14300 for processing the PLS-pre/post information can be signaled through the above-described preamble.

The third block 14200 for MIMO can include a Q-block interleaver block 14210 and a complex symbol generator block 14220, as illustrated in FIG. 14.

The Q-block interleaver block 14210 can permute a parity part of an FEC-encoded FEC block received from the FEC encoder. Accordingly, a parity part of an LDPC H matrix can be made into a cyclic structure like an information part. The Q-block interleaver block 14210 can permute the order of output bit blocks having Q size of the LDPC H matrix and then perform row-column block interleaving to generate final bit streams.

The complex symbol generator block 14220 receives the bit streams output from the Q-block interleaver block 14210, maps the bit streams to complex symbols and outputs the complex symbols. In this case, the complex symbol generator block 14220 can output the complex symbols through at least two paths. This can be modified by the designer.

The above-described blocks may be omitted or replaced by blocks having similar or identical functions according to design.

The coding & modulation module according to another embodiment of the present invention, illustrated in FIG. 14, can output data pipes, PLS-pre information and PLS-post information processed for respective paths to the frame structure module.

Figure 15:
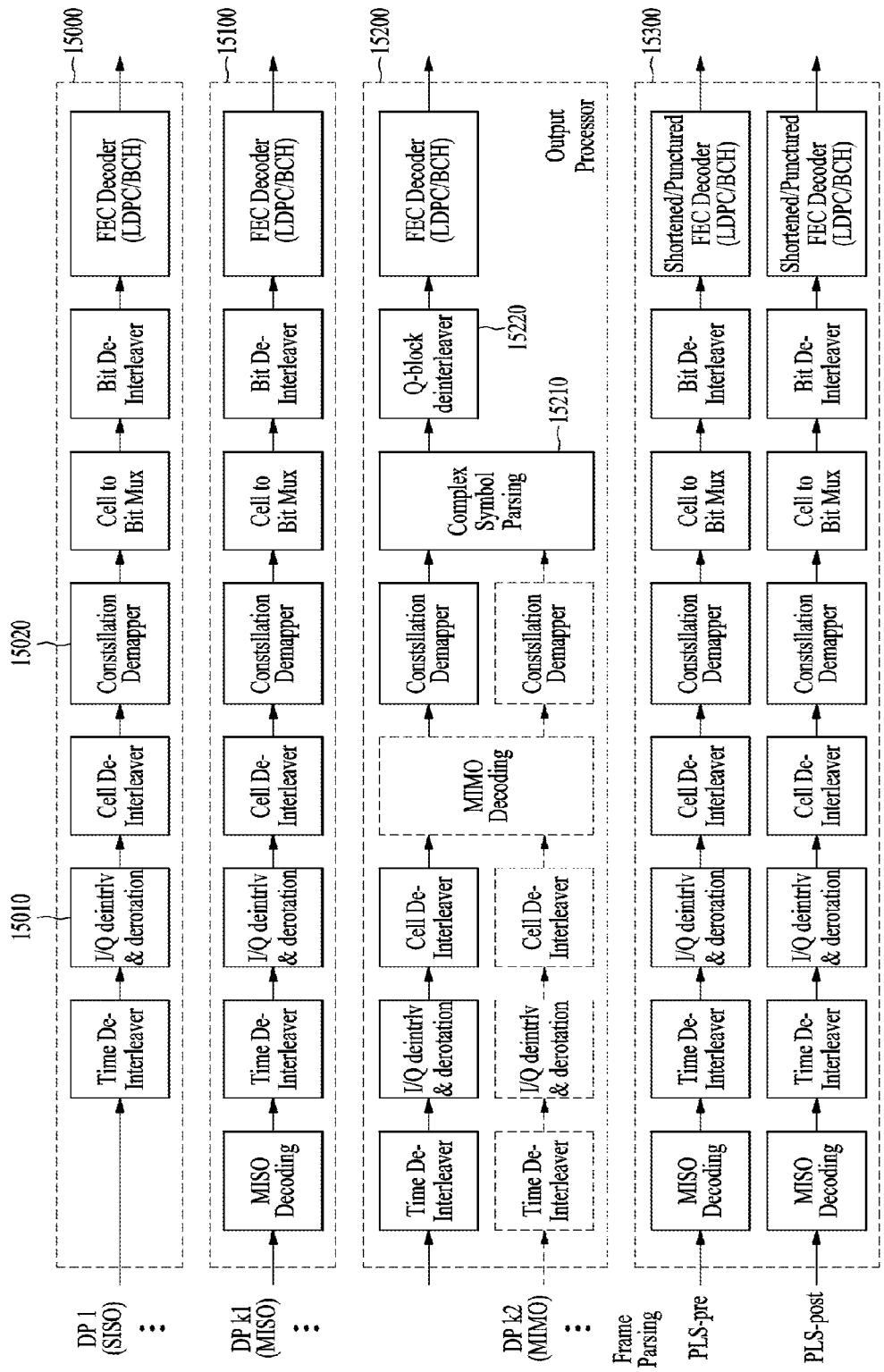
FIG. 15 illustrates a demapping & decoding module according to another embodiment of the present invention.

FIG. 15 illustrates a demapping & decoding module according to another embodiment of the present invention.

The demapping & decoding module shown in FIG. 15 corresponds to another embodiment of the demapping & decoding module illustrated in FIG. 11. The demapping & decoding module shown in FIG. 15 can perform a reverse operation of the operation of the coding & modulation module illustrated in FIG. 14.

As shown in FIG. 15, the demapping & decoding module according to another embodiment of the present invention can include a first block 15000 for SISO, a second block 11100 for MISO, a third block 15200 for MIMO and a fourth block 14300 for processing the PLS-pre/PLS-post information. In addition, the demapping & decoding module can include blocks for processing data pipes equally or differently according to design. The first to fourth blocks 15000 to 15300 shown in FIG. 15 are similar to the first to fourth blocks 11000 to 11300 illustrated in FIG. 11.

However, the first to fourth blocks 15000 to 15300 shown in FIG. 15 are distinguished from the first to fourth blocks 11000 to 11300 illustrated in FIG. 11 in that an I/Q deinterleaver and derotation block 15010 is present between the time interleaver and the cell deinterleaver of the first to fourth blocks 15000 to 15300, a constellation mapper 15010 included in the first to fourth blocks 15000 to 15300 has a function different from the first to fourth blocks 11000 to 11300 illustrated in FIG. 11 and the third block 15200 for MIMO has a configuration different from the third block 11200 for MIMO illustrated in FIG. 11. The following description focuses on these differences between the first to fourth blocks 15000 to 15300 shown in FIG. 15 and the first to fourth blocks 11000 to 11300 illustrated in FIG. 11.

The I/Q deinterleaver & derotation block 15010 can perform a reverse process of the process performed by the rotation & I/Q interleaver block 14020 illustrated in FIG. 14. That is, the I/Q deinterleaver & derotation block 15010 can deinterleave I and Q components I/Q-interleaved and transmitted by the apparatus for transmitting broadcast signals and derotate complex symbols having the restored I and Q components.

The I/Q deinterleaver & derotation block 15010 is commonly applicable to the first to fourth blocks 15000 to 15300, as described above. In this case, whether or not the I/Q deinterleaver & derotation block 15010 is applied to the fourth block 15300 for processing the PLS-pre/post information can be signaled through the above-described preamble.

The constellation demapper block 15020 can perform a reverse process of the process performed by the constellation mapper block 14010 illustrated in FIG. 14. That is, the constellation demapper block 15020 can demap cell-deinterleaved data without performing derotation.

The third block 15200 for MIMO can include a complex symbol parsing block 15210 and a Q-block deinterleaver block 15220, as shown in FIG. 15.

The complex symbol parsing block 15210 can perform a reverse process of the process performed by the complex symbol generator block 14220 illustrated in FIG. 14. That is, the complex symbol parsing block 15210 can parse complex data symbols and demap the same to bit data. In this case, the complex symbol parsing block 15210 can receive complex data symbols through at least two paths.

The Q-block deinterleaver block 15220 can perform a reverse process of the process carried out by the Q-block interleaver block 14210 illustrated in FIG. 14. That is, the Q-block deinterleaver block 15220 can restore Q size blocks according to row-column deinterleaving, restore the order of permuted blocks to the original order and then restore positions of parity bits to original positions according to parity deinterleaving.

The above-described blocks may be omitted or replaced by blocks having similar or identical functions according to design.

As illustrated in FIG. 15, the demapping & decoding module according to another embodiment of the present invention can output data pipes and PLS information processed for respective paths to the output processor.

As illustrated in FIG. 2, the input formatting module according to an embodiment of the present invention may include the mode adaptation module 2000 and the stream adaptation module 2100.

The mode adaptation module 2000 may include the input interface block 2010, the CRC-8 encoder block 2020, and the BB header insertion block 2030 as illustrated in FIG. 2. A detailed description of operation of each block is the same as in the above description.

Hereinafter, when input streams are input to the input formatting module 1000, a detailed operation of the mode adaptation module 2000 will be described.

The mode adaptation module 2000 according to an embodiment of the present invention may dividedly output the input streams according to a standard for coding and modulation or a service or service component standard. The mode adaptation module 2000 may transmit data streams divided on a service or service component basis to the stream adaptation module 2100 through a plurality of DPs.

Figure 16:
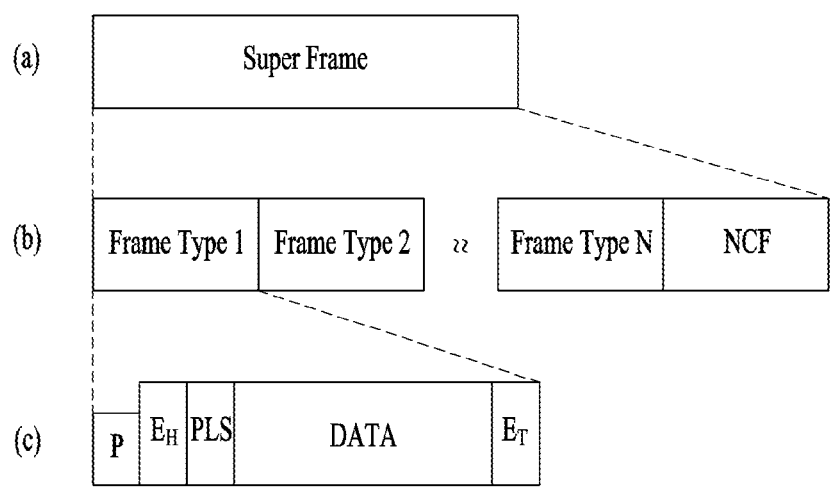
FIG. 16 illustrates a frame structure of a broadcast system according to an embodiment of the present invention.

FIG. 16 illustrates a frame structure of a broadcast system according to an embodiment of the present invention.

The cell mapper included in the above-described frame structure module may arrange cells that transmit input SISO, MISO or MIMO processed DP data, cells that transmit a common DP, and cells that transmit PLS data in a signal frame according to scheduling information. Thereafter, generated signal frames may be consecutively transmitted.

A broadcast signal transmission apparatus and transmission method according to an embodiment of the present invention may transmit signals of different broadcast signal transmission/reception systems on the same RF channel through multiplexing and a broadcast signal reception apparatus and reception method according to an embodiment of the present invention may process signals in response to the multiplexed signals. Accordingly, a broadcast signal transmission/reception system according to an embodiment of the present invention may provide a flexible broadcast transmission/reception system.

Accordingly, the broadcast signal transmission apparatus according to an embodiment of the present invention may consecutively transmit a plurality of superframes that carry data related to a broadcast service.

(a) of FIG. 16 illustrates a superframe according to an embodiment of the present invention and (b) of FIG. 16 illustrates a configuration of a superframe according to an embodiment of the present invention. As illustrated in (b) of FIG. 16, the superframe may include a plurality of signal frames and a non-compatible frame (NCF). A signal frame according to an embodiment of the present invention is a time division multiplexing (TDM) signal frame of a physical layer stage generated from the above-described frame structure module and the NCF is a frame capable of being used for a future broadcast service system.

The broadcast signal transmission apparatus according to an embodiment of the present invention may transmit broadcast services through multiplexing in frames in order to simultaneously provide various broadcast services (or various services) such as UHD, mobile, and MISO/MIMSO services through one RF. Different broadcast services may require different reception environments and transmission processing items according to a characteristic or purpose of each broadcast service.

Therefore, different broadcast services may be transmitted in the unit of signal frames and each signal frame may be defined as a different frame type according to a transmitted service. In addition, data included in each signal frame may be processed by a different transmission parameter and each signal frame may have a different FFT size and a different guard interval according to a broadcast service transmitted by the signal frame.

Accordingly, as illustrated in (b) of FIG. 16, signal frames of different types that transmit different services may be transmitted after being multiplexed within one superframe using a TDM scheme.

A frame type according to an embodiment of the present invention may be defined by a combination of an FFT mode, a guard interval mode, and pilot pattern information. Information about the frame type may be transmitted through a preamble region in a signal frame. A detailed description of the preamble will be given later.

In addition, configuration information of signal frames included in a superframe may be signaled through the above-described PLS and may be changed in units of superframes.

(c) of FIG. 16 illustrates a configuration of each signal frame. The signal frame may include a preamble, head and tail edge symbols (EH and ET), one or more PLS symbols, and a plurality of data symbols. The configuration of each signal frame may be changed according to designer's intention.

The preamble is located at the very front of the signal frame and may transmit a basic transmission parameter for identifying a broadcast system and a type of each signal frame and information for synchronization. Therefore, the broadcast signal reception apparatus according to an embodiment of the present invention may first detect the preamble of the signal frame to identify a corresponding broadcast system and a corresponding frame type and may selectively receive a broadcast signal corresponding to a type of a receiver to perform a decoding operation.

The head and tail edge symbols may be respectively located at the back of the preamble of each signal frame or at the very end of the signal frame. In the present invention, when an edge symbol is located after the preamble, this edge symbol may be referred to as a head edge symbol and, when an edge symbol is located at the very end of a signal frame, this edge symbol may be referred to as a tail edge symbol. The names, locations, or number of edge symbols may be changed according to designer's intention. The head and tail edge symbols may be inserted into each signal frame in order to support free preamble design and multiplexing of signal frames of different frame types. An edge symbol may include more pilots than a data symbol in order to enable frequencyonly interpolation and time interpolation between data symbols. Therefore, a pilot pattern of the edge symbol has higher density than a pilot pattern of the data symbol.

The PLS symbol is a symbol for transmitting the PLS data and may include additional system information (network topology/configuration, PAPR use, etc.), frame type ID/configuration information, and information necessary to extract and decode each DP.

The data symbol is used to transmit DP data and the above-described cell mapper may arrange a plurality of DPs on the data symbol.

Hereinafter, an operation of the broadcast signal reception apparatus for receiving and processing the aforementioned signal frame will be described. Specifically, the role and structure of each of the preamble and the edge symbols of the signal frame that aid in performing fast synchronization by the broadcast signal receiver according to an embodiment of the present invention will be described.

The broadcast signal reception apparatus according to an embodiment of the present invention may detect the preamble and perform synchronization with respect to a received broadcast signal using a preamble structure. That is, the broadcast signal reception apparatus may detect a signal frame that transmits a service capable of being processed in the broadcast signal reception apparatus and synchronize irregularly received signal frames over time.

Specifically, the broadcast signal reception apparatus according to an embodiment of the present invention may perform synchronization in the time domain by estimating a symbol timing offset of a received broadcast signal in the time domain, using a preamble structure and then estimate a carrier frequency offset (CFO). The broadcast signal transmission apparatus or the broadcast signal reception apparatus according to an embodiment of the present invention may estimate a fractional carrier frequency offset (FCFO) using the preamble structure.

Next, the broadcast signal reception apparatus according to an embodiment of the present invention may compensate for the location of a subcarrier by estimating a CFO of a multiple of an integer in the frequency domain, using the preamble structure.

The broadcast signal reception apparatus may acquire transmission parameter information by decoding data included in the preamble. The transmission parameter information may include a type of a profile (PHY_PROFILE) corresponding to broadcast service data that each signal frame transmits, an FFT size (FFT_SIZE) of the signal frame, a guard interval fraction value (GI_FRACTION) of the signal frame, a pilot mode (PILOT_MODE), and a flag indicating whether the signal frame has performed PAPR reduction.

The preamble according to an embodiment of the present invention may be designed to have a short length relative to a data symbol so that the broadcast signal reception apparatus may perform fast synchronization. Next, the broadcast signal reception apparatus may rapidly perform a procedure of receiving and synchronizing an edge symbol.

After performing synchronization of the preamble, the broadcast signal reception apparatus may perform synchronization with respect to the edge symbol. The edge symbol may be designed to have the same length as a PLS symbol or a data symbol.

The broadcast signal reception apparatus may perform synchronization based on edge symbols and estimate and compensate for a channel.

The edge symbols may include a reference signal so that the broadcast signal reception apparatus can perform synchronization and channel estimation. The reference signal according to an embodiment of the present invention may be referred to as a pilot. The pilot according to an embodiment of the present invention is used to transmit values that the broadcast signal reception apparatus has already known. Symbols in the signal frame of the present invention may include at least one pilot. Each pilot may be transmitted at a boosted power level according to a pilot type and a pilot pattern and information included in each pilot may be derived from a reference sequence which will be described later.

As described above, the PLS symbol and the data symbol may also include an additional pilot. After performing synchronization of the head edge symbol, the broadcast signal reception apparatus may perform a procedure of acquiring data included in the signal frame using then additional reference signal.

As described previously, a plurality of pilots may be inserted into the signal frame. A distribution form in which pilots are inserted at specific intervals in the frequency domain and the time domain may be referred to as a pilot pattern. The pilot pattern may be configured according to an FFT size or a guard interval.

The preamble according to an embodiment of the present invention may include information about an FFT size and a guard interval size as described above. Therefore, the broadcast signal reception apparatus according to an embodiment of the present invention may identify the pilot pattern based on the information about the FFT size and guard interval size by detecting the preamble.

Hereinafter, a pilot pattern inserted into an edge symbol will be described.

The broadcast signal transmission apparatus according to an embodiment of the present invention may insert pilots into an edge symbol, for fast synchronization of the broadcast signal reception apparatus. A pilot pattern of the edge symbol according to an embodiment of the present invention may cause the broadcast signal reception apparatus to perform synchronization after estimating an offset using the edge symbol and to more accurately estimate the offset using information included in a data symbol.

Specifically, the broadcast signal reception apparatus may estimate and compensate for an FCFO in the time domain, using a head edge symbol. In addition, the broadcast signal reception apparatus may estimate and compensate for a symbol timing offset (STO) using the head edge symbol.

The broadcast signal reception apparatus may perform synchronization by first estimating an integral CFO (ICFO) in the frequency domain, using the head edge symbol. In addition, the broadcast signal reception apparatus may estimate a channel transfer function (CTF) using the head edge symbol. The broadcast signal reception apparatus may also estimate an STO based on a channel impulse response (CIR), using the head edge symbol.

The broadcast signal reception apparatus according to an embodiment of the present invention may track a coarse symbol timing offset (CSTO) and an FCFO in the time domain, using a PLS symbol and a data symbol.

The broadcast signal reception apparatus according to an embodiment of the present invention may perform synchronization of a signal frame based on the ICFO, the STO, and the CSTO estimated using the edge symbol.

The broadcast signal reception apparatus according to an embodiment of the present invention may track a residual carrier frequency offset (RCFO) and a sampling frequency offset (SFO) in the frequency domain, using the PLS symbol and the data symbol.

The broadcast signal reception apparatus according to an embodiment of the present invention may track and synchronize a frequency offset of a signal frame generated in a transmission process of a broadcast signal based on the RCFO and the SFO estimated using the PLS symbol and the data symbol.

In addition, the broadcast signal reception apparatus according to an embodiment of the present invention may decode data included in the PLS symbol and the data symbol.

The above-described operation in which the broadcast signal reception apparatus according to an embodiment of the present invention estimates and compensates for each offset using symbols may be sequentially performed in order of the preamble, the edge symbol, the PLS symbol, and the data symbol. The broadcast signal reception apparatus according to an embodiment of the present invention can more rapidly and accurately acquire synchronization of a signal frame by estimating and compensating for offsets of sequentially received signal frames.

For fast synchronization by the broadcast signal reception apparatus, the present invention proposes a paired pilot pattern in which a pair of two consecutive pilots is inserted into the edge symbol and a scattered pilot pattern in which a plurality of pilots is distributively arranged in the frequency domain.

The paired pilot pattern according to an embodiment of the present invention may be generated based on a continual pilot.

The continual pilot may indicate the case in which the position of a pilot is fixed and a scattered pilot may indicate the case in which the position of a pilot is cyclically moved.

The continual pilot may be inserted into all symbols of a frame. The number and positions of continual pilots may be determined based on an FFT size and scattered pilots. The preamble according to an embodiment of the present invention may include the information about the FFT size and the guard interval size as described above. Therefore, the broadcast signal reception apparatus according to an embodiment of the present invention may identify a pilot pattern based on the information about the FFT size and the guard interval size by detecting the preamble.

The scattered pilot may not be included in a specific symbol of a frame. Specifically, the specific symbol may be a preamble. Alternatively, the scattered pilot may be included in a cell that transmits all DP data before being transmitted. A detailed description of the paired pilot pattern will be described below.

Figure 17:
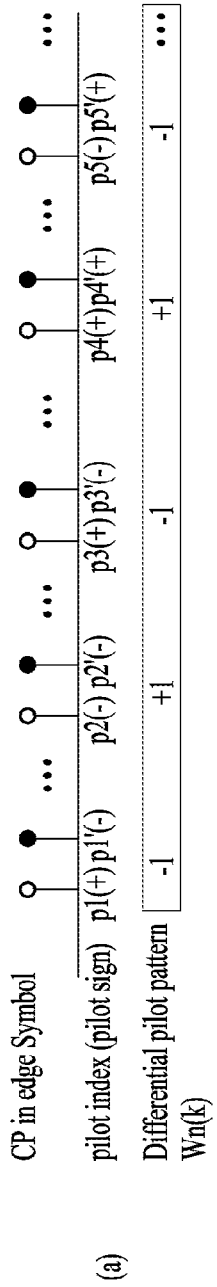
FIG. 17 illustrates a paired pilot pattern included in an edge symbol, an equation indicating an operation of a broadcast signal transmission apparatus using the paired pilot pattern, and an equation indicating an operation of a broadcast signal reception apparatus corresponding to the operation of the broadcast signal transmission apparatus, according to an embodiment of the present invention.

FIG. 17 illustrates a paired pilot pattern included in an edge symbol, an equation indicating an operation of a broadcast signal transmission apparatus using the paired pilot pattern, and an equation indicating an operation of a broadcast signal reception apparatus corresponding to the operation of the broadcast signal transmission apparatus, according to an embodiment of the present invention.

(a) is a diagram illustrating a paired pilot pattern included in an edge symbol according to an embodiment of the present invention, (b) illustrates an equation used when a broadcast signal transmission apparatus according to an embodiment of the present invention performs paired pilot insertion, and (c) illustrates an equation used when a broadcast signal reception apparatus according to an embodiment of the present invention estimates an ICFO.

Hereinafter, each drawing will be described.

In (a), the paired pilot pattern included in the edge symbol according to an embodiment of the present invention may have a form in which two pilots are consecutively distributed by generating an adjacent pilot based on an arbitrarily selected continual pilot (CP).

That is, in the present invention, a pair of an arbitrarily selected pilot p(n) and an adjacent subcarrier p(n+1) encoded by a differential modulation scheme may be referred to as a paired pilot.

Pilots that are the basis for generating the paired pilot pattern included in the edge symbol according to an embodiment of the present invention may be randomly positioned in the frequency domain.

The edge symbol having the paired pilot pattern according to an embodiment of the present invention may be robust against phase information distortion caused by a time offset and a frequency selective fading channel, because a subcarrier encoded by a differential modulation scheme and an arbitrarily selected pilot are adjacent.

In (b), the broadcast signal transmission apparatus according to an embodiment of the present invention may encode an arbitrarily selected pilot p(n) and an adjacent subcarrier (p(n+1)) using a specific sequence (w(k)) by the differential modulation scheme.

The specific sequence (w(k)) used when the broadcast signal transmission apparatus encodes a subcarrier may be predesigned to have a good mutual correlation.

(c) illustrates an equation using the specific sequence (w(k)) used during differential modulation in order for the broadcast signal reception apparatus according to an embodiment of the present invention to estimate an ICFO.

YEH(k) in the drawing represents a frequency domain signal of a head edge symbol and YEH(k+1) represents a frequency domain signal delayed by one sample from YEH(k). A test frequency offset used when the broadcast signal reception apparatus estimates the ICFO may be limited to a prescribed range by the previously performed approximate CFO estimation and compensation using the preamble.

Figure 18:
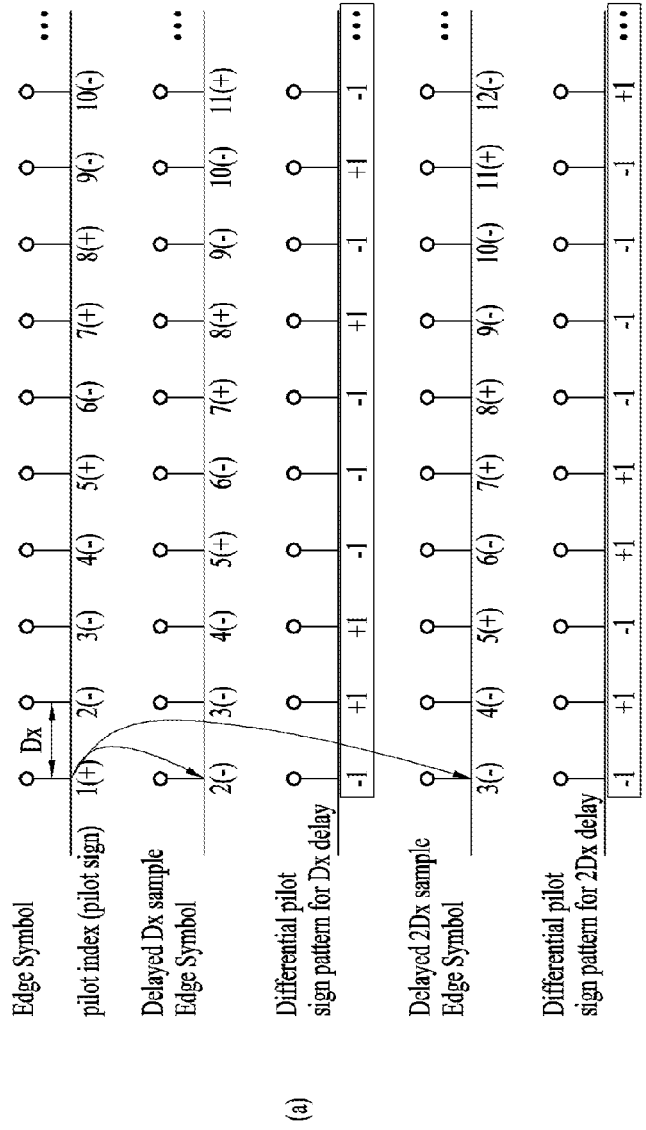
FIG. 18 illustrates a scattered pilot pattern included in an edge symbol, an equation indicating an operation of a broadcast signal transmission apparatus using the scattered pilot pattern, and an equation indicating an operation of a broadcast signal reception apparatus corresponding to the operation of the broadcast signal transmission apparatus, according to an embodiment of the present invention.

FIG. 18 illustrates a scattered pilot pattern included in an edge symbol, an equation indicating an operation of a broadcast signal transmission apparatus using the scattered pilot pattern, and an equation indicating an operation of a broadcast signal reception apparatus corresponding to the operation of the broadcast signal transmission apparatus, according to an embodiment of the present invention.

(a) illustrates a scattered pilot pattern including an edge symbol according to an embodiment of the present invention, (b) illustrates an equation used when a broadcast signal transmission apparatus according to an embodiment of the present invention performs scattered pilot insertion, and (c) illustrates an equation used when a broadcast signal reception apparatus according to an embodiment of the present invention estimates an ICFO.

In (a), the edge symbol may include scattered pilots in the unit of Dx in order to enable time interpolation between data symbols. Dx may indicate a distance between pilots in the frequency domain, which is applied when pilots included in a data symbol are inserted. The drawing illustrates the case in which a delay sample unit is Dx (delayed Dx sample edge symbol) and the case in which the delay sample unit is 2Dx (delayed 2Dx sample edge symbol).

In (b), the broadcast signal transmission apparatus according to an embodiment of the present invention may encode an arbitrarily selected scattered pilot (pn(k)) using a scattered pilot specific sequence (WL-Dx(k)) which is measured in units of delay sample units (L-Dx) by a differential modulation scheme.

The specific sequence (WL-Dx(k)) used when the broadcast signal transmission apparatus encodes the scattered pilot (pn(k)) may be predesigned to have a good mutual correlation according to a value of L-Dx.

L denotes a distance between adjacent scattered pilots when differential modulation is performed.

(a) illustrates a procedure in which the broadcast signal transmission apparatus generates a scattered pilot pattern inserted into an edge symbol. Specifically, (a) illustrates a procedure of generating a scattered pilot pattern (denoted as a differential pilot sign pattern for Dx delay in the drawing) encoded by a differential modulation scheme when L=1 and a scattered pilot pattern (denoted as a differential pilot sign pattern for 2Dx delay in the drawing) encoded by the differential modulation scheme when L=2.

(c) illustrates an equation using a scattered pilot pattern (WL-Dx(k)) by a differential demodulation scheme when the broadcast signal reception apparatus according to an embodiment of the present invention estimates an ICFO.

Symbols used in the equation are identical to the above description given with reference to (c) of FIG. 17.

The broadcast signal reception apparatus according to an embodiment of the present invention may acquire two correlations, that is, correlations in Dx and 2Dx, upon receiving an edge symbol to which the above-described scattered pilot pattern is applied. Therefore, even when some of scattered pilot information received by the broadcast signal reception apparatus is lost due to a poor signal reception channel environment, the lost scattered pilot information can be recovered.

The broadcast signal reception apparatus may select correlation output having a maximum value using a test frequency offset. The broadcast signal reception apparatus can estimate and compensate for an ICFO using correlation output having the maximum value.

Figure 19:
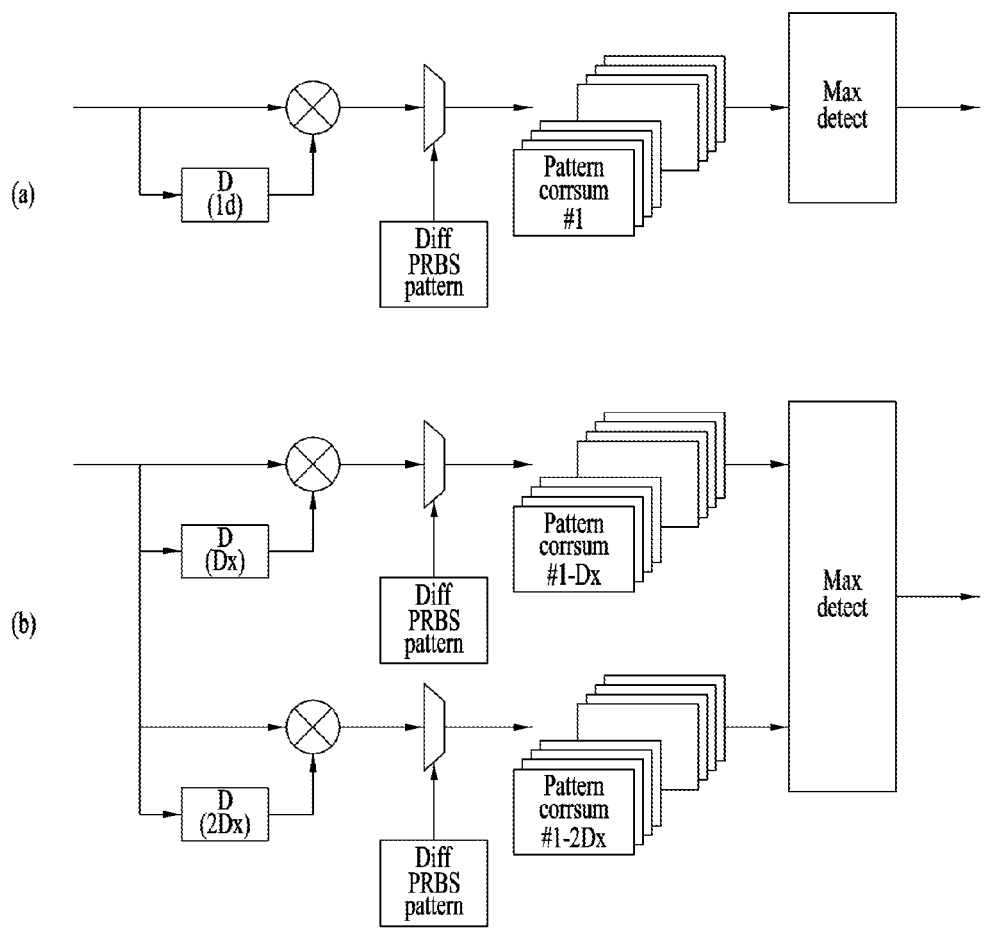
FIG. 19 illustrates a procedure in which a broadcast signal reception apparatus estimates a frequency offset according to an embodiment of the present invention.

FIG. 19 illustrates a procedure in which a broadcast signal reception apparatus estimates a frequency offset according to an embodiment of the present invention.

Specifically, (a) illustrates a procedure in which the broadcast signal reception apparatus estimates an ICFO when a paired pilot pattern is inserted into an edge symbol and (b) illustrates a procedure in which the broadcast signal reception apparatus estimates an ICFO when a scattered pilot pattern is inserted into an edge symbol.

Frequency offset estimation may be performed by, specifically, a reference signal detector module 9700.

A detailed ICFO estimation procedure is as described above.

Figure 20:
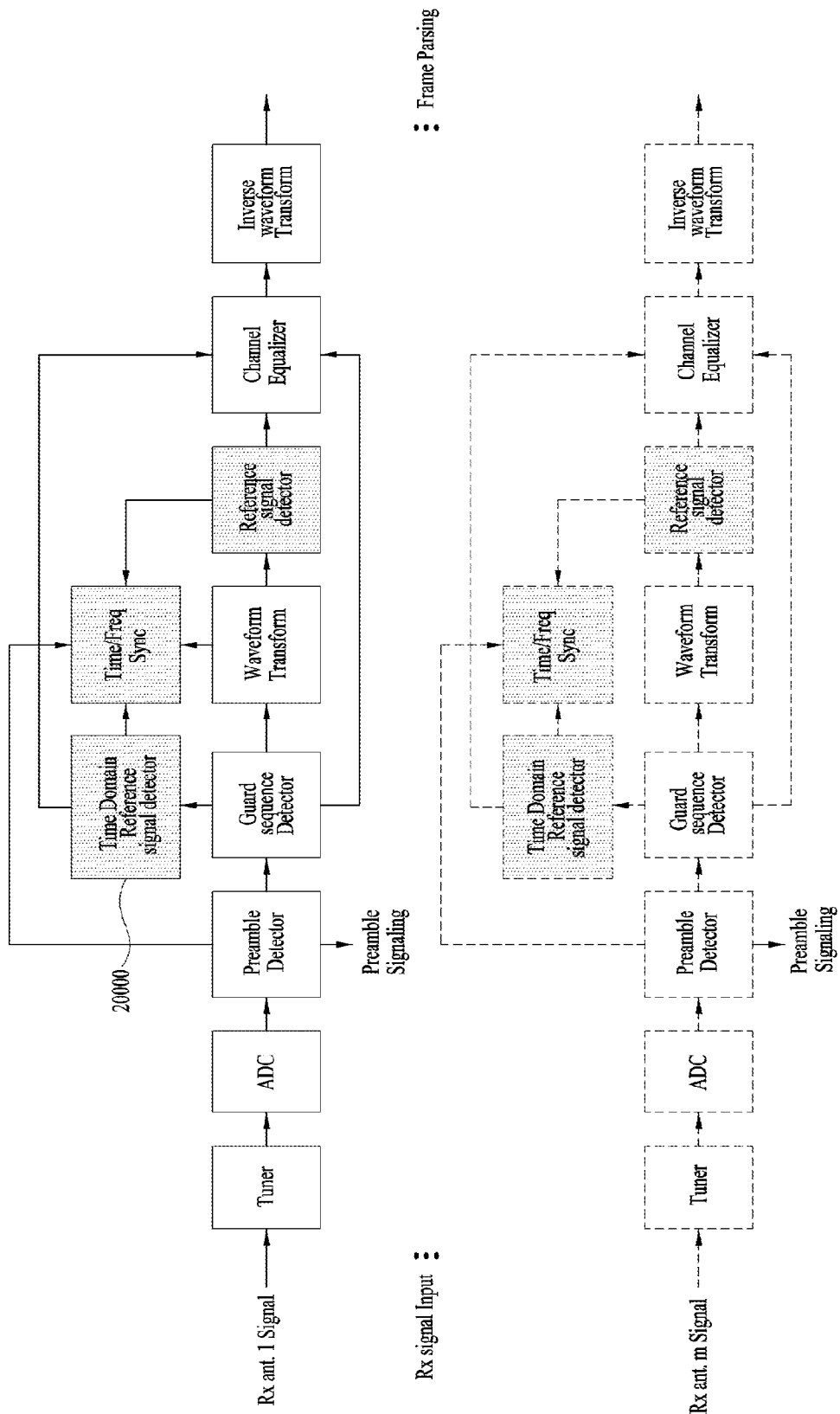
FIG. 20 illustrates a synchronization & demodulation module corresponding to an embodiment of the synchronization & demodulation module 8000 described in FIG. 8.

FIG. 20 illustrates a synchronization & demodulation module according to an embodiment of the present invention.

The synchronization & demodulation module illustrated in FIG. 20 corresponds to an embodiment of the synchronization & demodulation module 8000 described with reference to FIG. 8. In addition, the synchronization & demodulation module illustrated in FIG. 9 may perform an inverse operation of the waveform generation module described with reference to FIG. 7.

As described previously in FIG. 7, the reference signal insertion & PAPR reduction block 7100 may insert a reference signal into a predetermined position in every signal block and apply a PAPR reduction scheme in order to reduce a PAPR value in the time domain. The reference signal insertion & PAPR reduction block 7100 may insert the reference signal into a data symbol included in the above-described frame structure. The data symbol into which the reference signal is inserted may be specified by a designer. The reference signal insertion & PAPR reduction block 7100 may lower the PAPR value using the reference signal. The reference signal insertion & PAPR reduction block 7100 can reduce interference which may be generated from an adjacent channel by inserting dummy null data into the data symbol into which the reference signal is inserted. In addition, as described above, the broadcast signal reception apparatus according to an embodiment of the present invention can compensate for distortion by estimating a transmission channel and a synchronization offset using the reference signal as described above.

The synchronization & demodulation module according to an embodiment of the present invention may further include a time domain reference signal detector 20000. The time domain reference signal detector 20000 may detect a reference signal (or a pilot) for the time domain among received reference signals.

The time domain reference signal detector 20000 may identically perform an operation for synchronization among operations performed by the above-described broadcast signal reception apparatus.

The reference signal detector according to an embodiment of the present embodiment may serve as the same role as the above-described reference signal detector 9700. Specifically, the reference signal detector may detect a reference signal for the frequency domain.

Hereinafter, a waveform generation module 1300 according to an embodiment of the present invention may be referred to as an OFDM generation module.

As described above, the waveform transform block 9500 may perform FFT transform with respect to input data. An FFT size according to an embodiment of the present invention may be 4K, 8K, 16K, and 32K and an FFT mode may be defined in order to indicate the FFT size. The FFT mode may be signaled through a preamble (or a preamble signal or a preamble symbol) in a signal frame or may be signaled through PLS-pre or PLS-prost information. The FFT size may be changed according to designer's intention.

A reference sequence according to an embodiment of the present invention may be used to modulate the above-described pilot.

A reference sequence generator included in the reference signal insertion & PAPR reduction block 7100 according to an embodiment of the present invention may generate the reference sequence.

The reference sequence generator according to an embodiment of the present invention may include a symbol-level PRBS generator and a frame-level PRBS generator. In the present invention, the symbol-level PRBS generator and the frame-level PRBS generator may be referred to as a PRBS generator.

Figure 21:
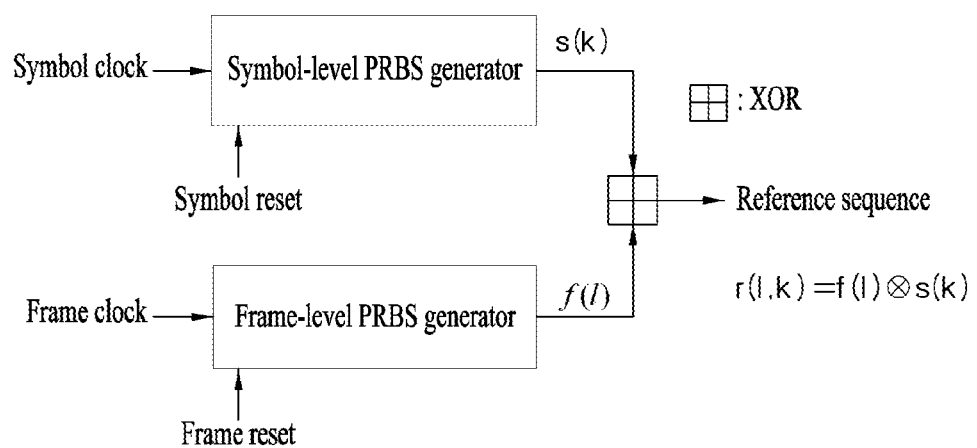
FIG. 21 illustrates a reference sequence generator according to an embodiment of the present invention.

FIG. 21 illustrates a reference sequence generator according to an embodiment of the present invention.

The reference sequence generator may include a symbol-level PRBS generator and a frame-level PRBS generator. The symbol-level PRBS generator may receive a symbol clock and a symbol reset and generate a PRBS output expressed as s(k).

The frame-level PRBS generator may receive a frame clock and a frame reset and generate an output expressed as f(l).

The reference sequence generator may generate a reference sequence (r(l,k)) by performing an XOR operation for the output s(k) of the symbol-level PRBS generator and the output f(l) of the frame-level PRBS generator.

Hereinafter, a detailed operation of the symbol-level PRBS generator and the frame-level PRBS generator will be described.

The symbol-level PRBS generator according to an embodiment of the present invention may generate a PRBS which is to be used in 8K, 16K, and 32K FFT modes. The symbol-level PRBS generator according to an embodiment of the present invention may generate the PRBS which is to be used in various FFT modes without being limited to an FFT mode. The symbol-level PRBS generator may generate a specific signature which is to be used in each FFT mode. The symbol-level PRBS generator may generate a specific signature for each pilot pattern.

Alternatively, the symbol-level PRBS generator may generate a specific sequence which is to be used for each FFT mode and each pilot pattern.

The symbol-level PRBS generator may perform operation within one OFDM symbol.

The symbol-level PRBS generator may randomly scramble all types of pilots, i.e., a CP, a scattered pilot (SP), a frame signal symbol pilot (FSSP), a frame edge symbol pilot (FESP), etc. Scrambling may be performed by a feedback shift register. A PRBS generator included in the reference sequence generator, which will be described below, may be comprised of a feedback shift register.

The scrambled pilots may be generated in the form of a PRBS. The first bit of the generated PRBS may be mapped to the first active carrier of each FFT mode. The FFT mode may include 8K, 16K, and 32K as described above.

The frame-level PRBS generator may perform operation within one OFDM symbol. Each value of the frame-level PRBS generator may be applied to one OFDM symbol.

The symbol-level PRBS generator according to an embodiment of the present invention may generate a specific sequence so that the broadcast signal reception apparatus can perform efficient frame synchronization.

The output of the symbol-level PRBS generator may be inverted or may not be inverted according to the output of the frame-level PRBS generator.

Hereinafter, an embodiment of the reference sequence generator according to an order of the symbol-level PRBS generator and the frame-level PRBS generator will be described. In the present invention, the case in which an order of the symbol-level PRBS generator is 13 and 15 and an order of the frame-level PRBS generator is 8 is described as an embodiment.

The order of the PRBS generator may be changed according to designer's intention.

The symbol-level PRBS generator and the frame-level PRBS generator according to an embodiment of the present invention have the following effects.

The symbol-level PRBS generator according to an embodiment of the present invention can generate a PRBS which is to be used for 8K, 16K, and 32K FFT modes. While an 11th-order symbol-level PRBS generator generates a PRBS which is to be used for a minimum 1K FFT mode, the symbol-level PRBS generator according to an embodiment of the present invention may be designed to generate a PRBS which is to be used for a minimum 8K FFT mode for increase of randomness.

The frame-level PRBS generator according to an embodiment of the present invention can generate a reference sequence even without an additional frame-level sequence table. When the broadcast signal transmission apparatus generates a reference sequence using a scheme of generating a PN sequence, the frame level sequence table is needed so that capacity of a transmitter and a receiver increases. Accordingly, the frame-level PRBS generator according to an embodiment of the present invention can remarkably reduce the capacity of the transmitter and the receiver.

Figure 22:
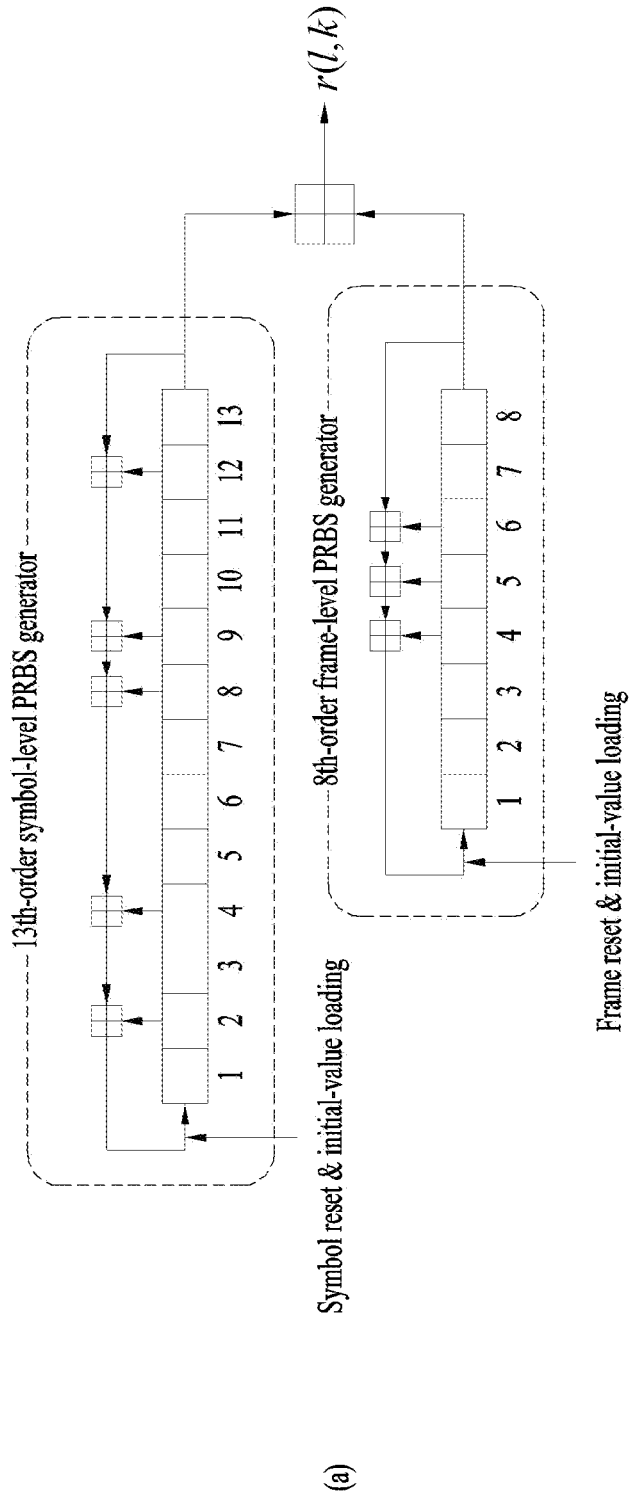
FIG. 22 illustrates a reference sequence generator including a 13th-order symbol-level PRBS generator and an 8th-order frame-level PRBS generator according to an embodiment of the present invention.

FIG. 22 illustrates a reference sequence generator including a 13th-order symbol-level PRBS generator and an 8th-order frame-level PRBS generator according to an embodiment of the present invention.

(a) is a diagram illustrating a sequence generator according to an embodiment of the present invention.

(b) indicates a polynomial of a PRBS capable of being generated by the 13th-order symbol-level PRBS generator according to an embodiment of the present invention.

(c) indicates an initial value of the 13th-order symbol-level PRBS generator according to an embodiment of the present invention.

(d) indicates a polynomial of a PRBS capable of being generated by the 8th-order frame-level PRBS generator according to an embodiment of the present invention.

(e) indicates an initial value of the 8th-order frame-level PRBS generator according to an embodiment of the present invention.

The 13th-order symbol-level PRBS generator may receive symbol reset and initial-value loading.

The 8th-order frame-level PRBS generator may receive frame reset and initial-value loading.

The 13th-order symbol-level PRBS generator may generate a PRBS which is to be used for a minimum 8K FFT mode. In addition, the 13th-order symbol-level PRBS generator may generate a PRBS which is to be used for 16K and 32K FFT modes.

The polynomial and initial value of each PRBS generator may be changed according to designer.

Figure 23:
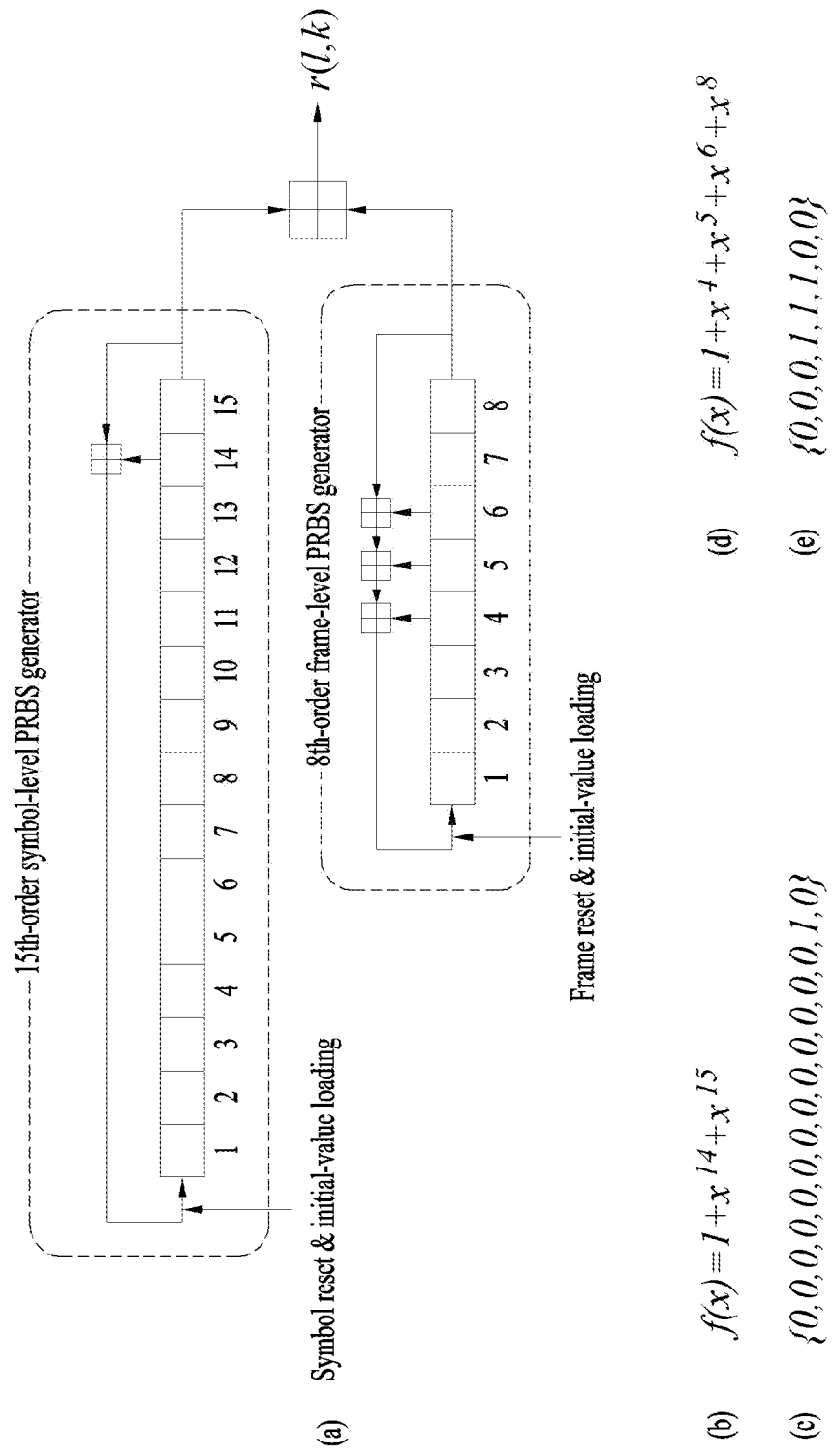
FIG. 23 illustrates a reference sequence generator including a 15th-order symbol-level PRBS generator and an 8th-order frame-level PRBS generator according to an embodiment of the present invention.

FIG. 23 illustrates a reference sequence generator including a 15th-order symbol-level PRBS generator and an 8th-order frame-level PRBS generator according to an embodiment of the present invention.

(a) is a diagram illustrating a sequence generator according to an embodiment of the present invention.

(b) indicates a polynomial of a PRBS capable of being generated by the 15th-order symbol-level PRBS generator according to an embodiment of the present invention.

(c) indicates an initial value of the 15th-order symbol-level PRBS generator according to an embodiment of the present invention.

(d) indicates a polynomial of a PRBS capable of being generated by the 8th-order frame-level PRBS generator according to an embodiment of the present invention.

(e) indicates an initial value of the 8th-order frame-level PRBS generator according to an embodiment of the present invention.

The 15th-order symbol-level PRBS generator may receive symbol reset and initial-value loading.

The 8th frame-level PRBS generator may receive frame reset and initial-value loading.

The 15th-order symbol-level PRBS generator may generate a PRBS which is to be used for a maximum 32K FFT mode. A part of a PRBS generated by the 13th symbol-level PRBS generator may be used for 8K and 16K FFT modes.

The polynomial and initial value of each PRBS generator may be changed according to designer.

The synchronization & demodulation module 9000 of a broadcast signal reception apparatus according to an embodiment of the present invention may use the above-described reference sequence. Specifically, the synchronization & demodulation module 9000 may detect a reference signal and a reference sequence included in a signal frame. The broadcast signal reception apparatus may perform synchronization using the reference signal and reference sequence detected from the signal frame. Alternatively, the broadcast signal reception apparatus may perform channel estimation using the reference signal and reference sequence detected from the signal frame.

Figure 24:
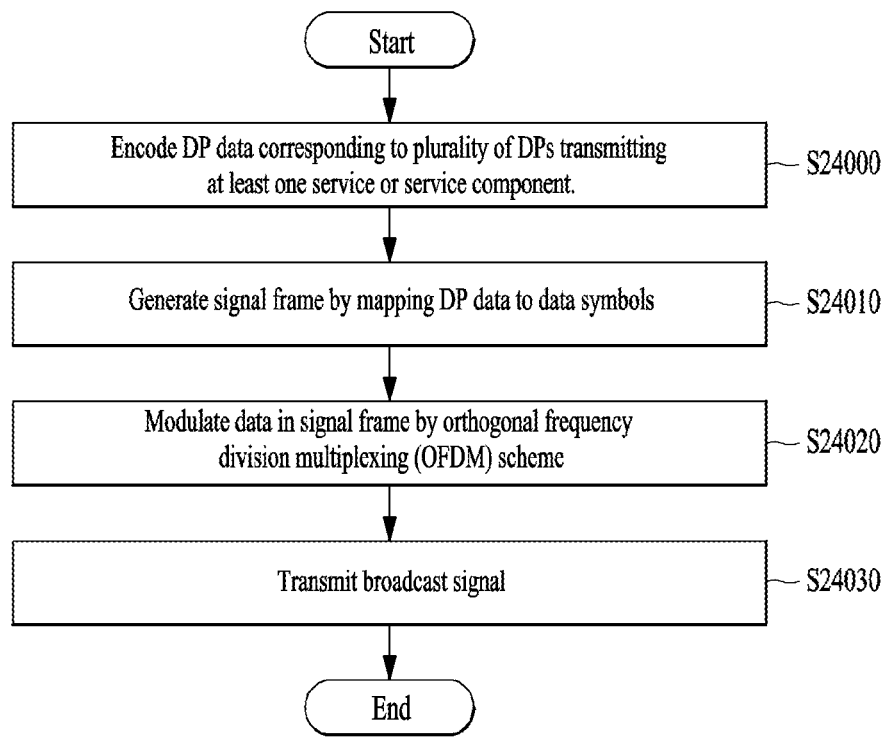
FIG. 24 is a flowchart illustrating a broadcast signal transmission method according to an embodiment of the present invention.

FIG. 24 is a flowchart illustrating a broadcast signal transmission method according to an embodiment of the present invention.

The broadcast signal transmission apparatus according to an embodiment of the present invention may encode data (or service data) transmitting at least one broadcast service component (S24000). Data according to an embodiment of the present invention may be processed in units of DPs corresponding to the data as described above. Data encoding may be performed by the coding & modulation module 1100.

Next, the broadcast signal transmission apparatus according to an embodiment of the present invention may generate at least one signal frame (S24010). Hereinafter, the signal frame described in the flowchart will be referred to as a signal frame. The broadcast signal apparatus according to an embodiment of the present invention may generate the signal frame by mapping DP data to a data symbol. As described above, the signal frame may include a preamble, a PLS symbol, a data symbol, and an edge symbol. The signal frame may be generated by the frame structure module 1200.

Next, the broadcast signal transmission apparatus according to an embodiment of the present invention may modulate the generated at least one signal frame by an OFDM scheme (S24020). The preamble and symbols according to an embodiment of the present invention may include one or more pilots. The broadcast signal transmission apparatus according to an embodiment of the present invention may generate a reference sequence and insert a plurality of pilots into the signal frame, as described previously. As described above, the broadcast signal transmission apparatus according to an embodiment of the present invention may modulate the pilots based on the generated reference sequence. The broadcast signal transmission apparatus according to an embodiment of the present invention may insert the pilots in a distributed form of being inserted at a specific interval in the frequency domain and the time domain in which each symbol of the signal frame is included. The reference signal insertion & PAPR reduction block 7100 according to an embodiment of the present invention may insert the pilots into each symbol of the signal frame.

Thereafter, the broadcast signal transmission apparatus according to an embodiment of the present invention may transmit at least one broadcast signal including at least one modulated signal frame (S24030).

FIG. 25 is a flowchart illustrating a broadcast signal reception method according to an embodiment of the present invention.

FIG. 25 corresponds to an inverse procedure of the broadcast signal transmission method described in FIG. 24.

The broadcast signal reception apparatus according to an embodiment of the present invention may receive at least one broadcast signal (S25000). The broadcast signal according to an embodiment of the present invention may include one or more signal frames. Each signal frame may include a preamble, an edge symbol, a PLS symbol, and a data symbol. As described above, the broadcast signal reception apparatus receiving the broadcast signal may detect the preamble and perform synchronization for the received broadcast signal using a preamble structure. That is, the broadcast signal reception apparatus may detect the signal frame that transmits a service capable of being processed in the broadcast signal reception apparatus and synchronize the signal frame irregularly received over time. Next, the broadcast signal reception apparatus according to an embodiment of the present invention may synchronize the signal frame by detecting pilots that the edge symbol, the PLS symbol, and the data symbol include.

Synchronization of the broadcast signal may be performed by the synchronization & demodulation module 8000. The synchronization & demodulation module according to an embodiment of the present invention may further include the time domain reference signal detector 20000. The time domain reference signal detector 20000 may detect a reference signal (or a pilot) for the time domain among received reference signals.

The time domain reference signal detector 20000 may identically perform an operation for synchronization among operations performed by the above-described broadcast signal reception apparatus.

The reference signal detector according to an embodiment of the present invention may perform the same role as the above-described reference signal detector 9700. Specifically, the reference signal detector may detect a reference signal for the frequency domain.

Next, the broadcast signal reception apparatus according to an embodiment of the present invention may demodulate the received at least one broadcast signal by an OFDM scheme (S25010). The broadcast signal may be demodulated by the synchronization & demodulation module 8000.

Thereafter, the broadcast signal reception apparatus according to an embodiment of the present invention may separate at least one signal frame from the demodulated broadcast signal (S25020). The signal frame may be separated by the frame parsing module 8100.

Next, the broadcast signal reception apparatus according to an embodiment of the present invention may demap data (or service data) included in the at least one signal frame (S25030). The data may be demapped by the demapping & decoding module 8200.

The broadcast signal reception apparatus according to an embodiment of the present invention may decode the service data transmitting at least one broadcast service component (S25040). The data may be decoded by the demapping & decoding module 8200.

While the present invention has been described with reference to separate drawings for convenience's sake, a new embodiment may be implemented by combining embodiments described in the drawings. When needed, designing a computer-readable recording medium having recorded thereon a program for executing the afore-described embodiments of the present invention may fall within the scope of the present invention.

The apparatus and method according to the present invention are not limited to the above-described embodiments. The whole or part of each embodiment may be selectively combined with that of another embodiment so as to make various modifications to the embodiments.

The broadcast signal transmission/reception method according to the present invention can also be embodied as processor-readable code on a processor-readable recording medium. The processor-readable recording medium is any data storage device that can store data which can be thereafter read by a processor. Examples of the processor-readable recording medium include read-only memory (ROM), random-access memory (RAM), magnetic tapes, floppy disks, optical data storage devices and carrier waves (e.g., transmission through the Internet). The processor-readable recording medium can also be distributed over network coupled computer systems so that the processor-readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

In addition, the disclosure describes both a product invention as well as a method invention, and descriptions of both inventions may be complementarily applied as needed.

MODE FOR INVENTION

Various embodiments have been described in the best mode for carrying out the invention.

INDUSTRIAL APPLICABILITY

The present invention has industrial applicability in fields related to a broadcast signal transmission method, a broadcast signal reception method, a broadcast signal transmission apparatus, and a broadcast signal reception apparatus.

The invention claimed is:

1. A method for transmitting broadcast signals, the method comprising:
encoding data pipe (DP) data corresponding to each DP which carries at least one service data or service component;
building at least one signal frame by mapping the encoded DP data into data symbols;
modulating data of the at least one signal frame by an Orthogonal Frequency Division Multiplex (OFDM) scheme; and
transmitting the broadcast signals carrying the modulated data,
wherein each signal frame includes edge symbols and the data symbols, and
wherein a first edge symbol is positioned after a preamble of the broadcast signal and a second edge symbol is positioned at an end of the signal frame.

2. The method of claim 1,
wherein the preamble includes signaling data for the broadcast signals, and
wherein the signaling data includes Fast Fourier Trasnform (FFT) size information, guard interval information, pilot pattern information and Peak to Average Power ratio (PAPR) information.

3. The method of claim 1,
wherein a pilot pattern of the first edge symbol and the second edge symbol has a greater pilot density than a pilot pattern of the data symbols.

4. The method of claim 3,
wherein the pilot pattern varies based on a FFT size and a guard interval size.

5. The method of claim 3,
wherein the pilot pattern is acquired based on a reference sequence which is generated by a reference sequence generator.

6. A method for receiving broadcast signals, comprising:
receiving a broadcast signal;
demodulating the broadcast signal by an orthogonal frequency division multiplexing (OFDM) scheme;
parsing at least one signal frame from the demodulated broadcast signal;
demapping data pipe (DP) data corresponding to each of a plurality of DPs transmitting at least one service or service component from data symbols included in the parsed at least one signal frame; and
decoding the demapped DP data,
wherein each signal frame includes edge symbols and the data symbols, and
wherein a first edge symbol is positioned after a preamble of the broadcast signal and a second edge symbol is positioned at an end of the signal frame.

7. The method of claim 6,
wherein the preamble includes signaling data for the broadcast signals, and
wherein the signaling data includes Fast Fourier Trasnform (FFT) size information, guard interval information, pilot pattern information and Peak to Average Power ratio (PAPR) information.

8. The method of claim 6,
wherein a pilot pattern of the first edge symbol and the second edge symbol has a greater pilot density than a pilot pattern of the data symbols.

9. The method of claim 8,
wherein the pilot pattern varies based on a FFT size and a guard interval size.

10. The method of claim 8,
wherein the pilot pattern is acquired based on a reference sequence which is generated by a reference sequence generator.

11. An apparatus for transmitting broadcast signals, comprising:
an encoder to encode data pipe (DP) data corresponding to each of a plurality of DPs transmitting at least one service or service component;
a mapper to build at least one signal frame by mapping the encoded DP data to data symbols;
a modulator to modulate data included in the at least one signal frame by an orthogonal frequency division multiplexing (OFDM) scheme; and
a transmitter to transmit a broadcast signal including the modulated data,
wherein each signal frame includes edge symbols and the data symbols, and
wherein a first edge symbol is positioned after a preamble of the broadcast signal and a second edge symbol is positioned at an end of the signal frame.

12. The apparatus of claim 11,
wherein the preamble includes signaling data for the broadcast signals, and
wherein the signaling data includes Fast Fourier Trasnform (FFT) size information, guard interval information, pilot pattern information and Peak to Average Power ratio (PAPR) information.

13. The apparatus of claim 11,
wherein a pilot pattern of the first edge symbol and the second edge symbol has a greater pilot density than a pilot pattern of the data symbols.

14. The apparatus of claim 13,
wherein the pilot pattern varies based on a FFT size and a guard interval size.

15. The apparatus of claim 13,
wherein the pilot pattern is acquired based on a reference sequence which is generated by a reference sequence generator.

16. An apparatus for receiving broadcast signals, comprising:
a receiver to receive a broadcast signal;
a demodulator to demodulate the broadcast signal by an orthogonal frequency division multiplexing (OFDM) scheme;

a parser to parse at least one signal frame from the demodulated broadcast signal;

a demapper to demap data pipe (DP) data corresponding to each of a plurality of DPs transmitting at least one service or service component from data symbols included in the parsed at least one signal frame; and a decoder to decode the demapped DP data, wherein each signal frame includes edge symbols and the data symbols, and wherein a first edge symbol is positioned after a preamble of the broadcast signal and a second edge symbol is positioned at an end of the signal frame.

17. The apparatus of claim 16, wherein the preamble includes signaling data for the broadcast signals, and wherein the signaling data includes Fast Fourier Trasnform (FFT) size information, guard interval information, pilot pattern information and Peak to Average Power ratio (PAPR) information.

18. The apparatus of claim 16, wherein a pilot pattern of the first edge symbol and the second edge symbol has a greater pilot density than a pilot pattern of the data symbols.

19. The apparatus of claim 18, wherein the pilot pattern varies based on a FFT size and a guard interval size.

20. The apparatus of claim 18, wherein the pilot pattern is acquired based on a reference sequence which is generated by a reference sequence generator.

* * * * *